US008471858B2

(12) United States Patent
Ritts et al.

(10) Patent No.: US 8,471,858 B2
(45) Date of Patent: Jun. 25, 2013

(54) DISPLAYING A VISUAL REPRESENTATION OF PERFORMANCE METRICS FOR RENDERED GRAPHICS ELEMENTS

(75) Inventors: James P. Ritts, San Diego, CA (US); Baback Elmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/791,239

(22) Filed: Jun. 1, 2010

(65) Prior Publication Data

US 2011/0018884 A1 Jan. 27, 2011

Related U.S. Application Data

(60) Provisional application No. 61/183,476, filed on Jun. 2, 2009.

(51) Int. Cl.

| | |
|---|---|
| ***G06F 15/16*** | (2006.01) |
| ***G06F 15/00*** | (2006.01) |
| ***G06T 1/00*** | (2006.01) |

(52) U.S. Cl.
USPC .......................................... 345/502; 345/501

(58) Field of Classification Search
USPC .......................................... 345/501, 502, 506
See application file for complete search history.

(56) References Cited

U.S. PATENT DOCUMENTS

| | | | |
|---|---|---|---|
| 5,894,308 A | 4/1999 | Isaacs | |
| 6,313,838 B1 | 11/2001 | Deering | |
| 6,952,206 B1 | 10/2005 | Craighead | |
| 7,903,116 B1 * | 3/2011 | Klock et al. | 345/501 |
| 8,284,205 B2 * | 10/2012 | Miller et al. | 345/502 |
| 2002/0145611 A1 | 10/2002 | Dye et al. | |
| 2005/0025385 A1 | 2/2005 | Chang et al. | |
| 2005/0140694 A1 | 6/2005 | Subramanian et al. | |

(Continued)

FOREIGN PATENT DOCUMENTS

| | | |
|---|---|---|
| JP | H1097605 A | 4/1998 |
| JP | 2007538319 A | 12/2007 |
| JP | 2008165740 A | 7/2008 |
| WO | 2008127517 A1 | 10/2008 |

OTHER PUBLICATIONS

Haynes R, et al., "A visualization tool for analyzing cluster performance data" 42nd. Annual Symposium on Foundations of Computer Science.(FOCS 2001). Las Vegas, Oct. 14-17, 2001; [Annual Symposium on Foundations of Computer Science], Los Alamitos, CA : IEEE Comp. Soc, US, Oct. 8, 2001, pp. 295-302, XP010565178 ISBN: 978-0-7695-1390.

(Continued)

*Primary Examiner* — Jacinta M Crawford
(74) *Attorney, Agent, or Firm* — James R. Gambale, Jr.

(57) ABSTRACT

The present disclosure describes various techniques for displaying a visual representation of performance metrics for rendered graphics elements. One example method comprises receiving performance information provided by a graphics processing unit, wherein the performance information has been measured by the graphics processing unit in association with individual graphics elements for rendering a graphics scene, and computing values of a performance metric for the graphics elements based upon the performance information, wherein each computed value is associated with at least one of the graphics elements. The method further comprises assigning graphical identifiers to the graphics elements based upon the computed values of the performance metric for the graphics elements, wherein one of the graphical identifiers is assigned to each of the graphics elements, and displaying the graphics elements, when rendering the graphics scene, according to the graphical identifiers that are assigned to the graphics elements.

42 Claims, 12 Drawing Sheets

U.S. PATENT DOCUMENTS

2005/0253855 A1 11/2005 Hutchins et al.

OTHER PUBLICATIONS

International Search Report and Written Opinion—PCT/US2010/037103, International Search Authority—European Patent Office—Oct. 6, 2010

Justin Whitney: "Tools and Techniques for GPU Performance Profi11ing" Sep. 24, 2007, XP002602129 Retrieved from the Internet: URL:http://developer.amd.com/documentati on /articles/pages/9242007176.aspx [retrieved on Sep. 20, 2010].

* cited by examiner

DISPLAYING A VISUAL REPRESENTATION OF PERFORMANCE METRICS FOR RENDERED GRAPHICS ELEMENTS

This application claims the benefit of U.S. Provisional Application 61/183,476, filed on Jun. 2, 2009, the entire content of which is incorporated herein by reference.

TECHNICAL FIELD

This disclosure relates to display of graphics images.

BACKGROUND

Graphics processors are widely used to render two-dimensional (2D) and three-dimensional (3D) images for various applications, such as video games, graphics programs, computer-aided design (CAD) applications, simulation and visualization tools, and imaging. Display processors may be used to display the rendered output of the graphics processor for presentation to a user via a display device.

Graphics applications, such as 3D graphics applications, may describe or define contents of a scene by invoking application programming interface (API) calls, or instructions, which in turn use the underlying graphics hardware, such as one or more processors in a graphics device, to generate an image. The graphics hardware may undergo a series of state transitions that are exercised through the invocation of these APIs. A full set of states or state transitions for each API call, such as a draw call or instruction, may describe the process with which the image is rendered by the hardware.

In the development of an embedded, hardware-accelerated graphics application, it is often difficult to quantify many aspects of how individual graphics elements (e.g., meshes, polygons, or other graphical primitives) are processed by a graphics processing unit (GPU) hardware device. Such aspects of GPU processing, such as the number of clock cycles devoted to the element, stalls incurred in its rendering, memory bandwidth consumed, etc., constitute highly valuable information for an application developer.

SUMMARY

The present disclosure describes various techniques for providing a performance analysis application that may be used to display a visual representation of performance metrics for rendered graphics elements. The analysis application may, in some cases, be used by developers who are writing multimedia applications for platforms that make use of certain application programming interfaces (APIs), such as Open Graphics Library) (OpenGL®), OpenGL® for embedded systems (OpenGL® ES), or OpenVG (vector graphics) APIs. The analysis application may allow an application developer to visualize a large set of properties of the processing of individual 2D or 3D elements that are rendered by graphics processing hardware. Information gleaned from this process may help the developer more effectively tune design or performance characteristics of the developed application in order to run more efficiently on a targeted hardware platform.

In some instances, the analysis application may enable the capture of one or more large sets of performance measurements from a target device such as a mobile or other device, for each individual graphics element that is rendered in a graphics scene. The target device may be the device, or device class, on which the graphics application is intended to operate. The application may allow a developer to graphically visualize performance metrics on a development device based upon received performance data. The development device may comprise the actual device that collects the performance data or a separate device (e.g., a personal computer that serves as an emulator or simulator of the actual device).

One example method comprises receiving performance information provided by a graphics processing unit, wherein the performance information has been measured by the graphics processing unit in association with individual graphics elements for rendering a graphics scene, and computing values of a performance metric for the graphics elements based upon the performance information, wherein each computed value is associated with at least one of the graphics elements. The method further comprises assigning graphical identifiers to the graphics elements based upon the computed values of the performance metric for the graphics elements, wherein one of the graphical identifiers is assigned to each of the graphics elements, and displaying the graphics elements, when rendering the graphics scene, according to the graphical identifiers that are assigned to the graphics elements.

One example device includes a display device and one or more processors. The one or more processors are configured to receive performance information provided by a graphics processing unit, wherein the performance information has been measured by the graphics processing unit in association with individual graphics elements for rendering a graphics scene, and to compute values of a performance metric for the graphics elements based upon the performance information, wherein each computed value is associated with at least one of the graphics elements. The one or more processors are further configured to assign graphical identifiers to the graphics elements based upon the computed values of the performance metric for the graphics elements, wherein one of the graphical identifiers is assigned to each of the graphics elements, and to display on the display device the graphics elements, when rendering the graphics scene, according to the graphical identifiers that are assigned to the graphics elements.

One example computer-readable storage medium includes instructions for causing one or more programmable processors to receive performance information provided by a graphics processing unit of a graphics device, wherein the performance information has been measured by the graphics processing unit in association with individual graphics elements for rendering a graphics scene, and to compute values of a performance metric for the graphics elements based upon the performance information, wherein each computed value is associated with at least one of the graphics elements. The computer-readable storage medium further includes instructions to assign graphical identifiers to the graphics elements based upon the computed values of the performance metric for the graphics elements, wherein one of the graphical identifiers is assigned to each of the graphics elements, and to display the graphics elements, when rendering the graphics scene, according to the graphical identifiers that are assigned to the graphics elements.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

DETAILED DESCRIPTION

Figure 1:
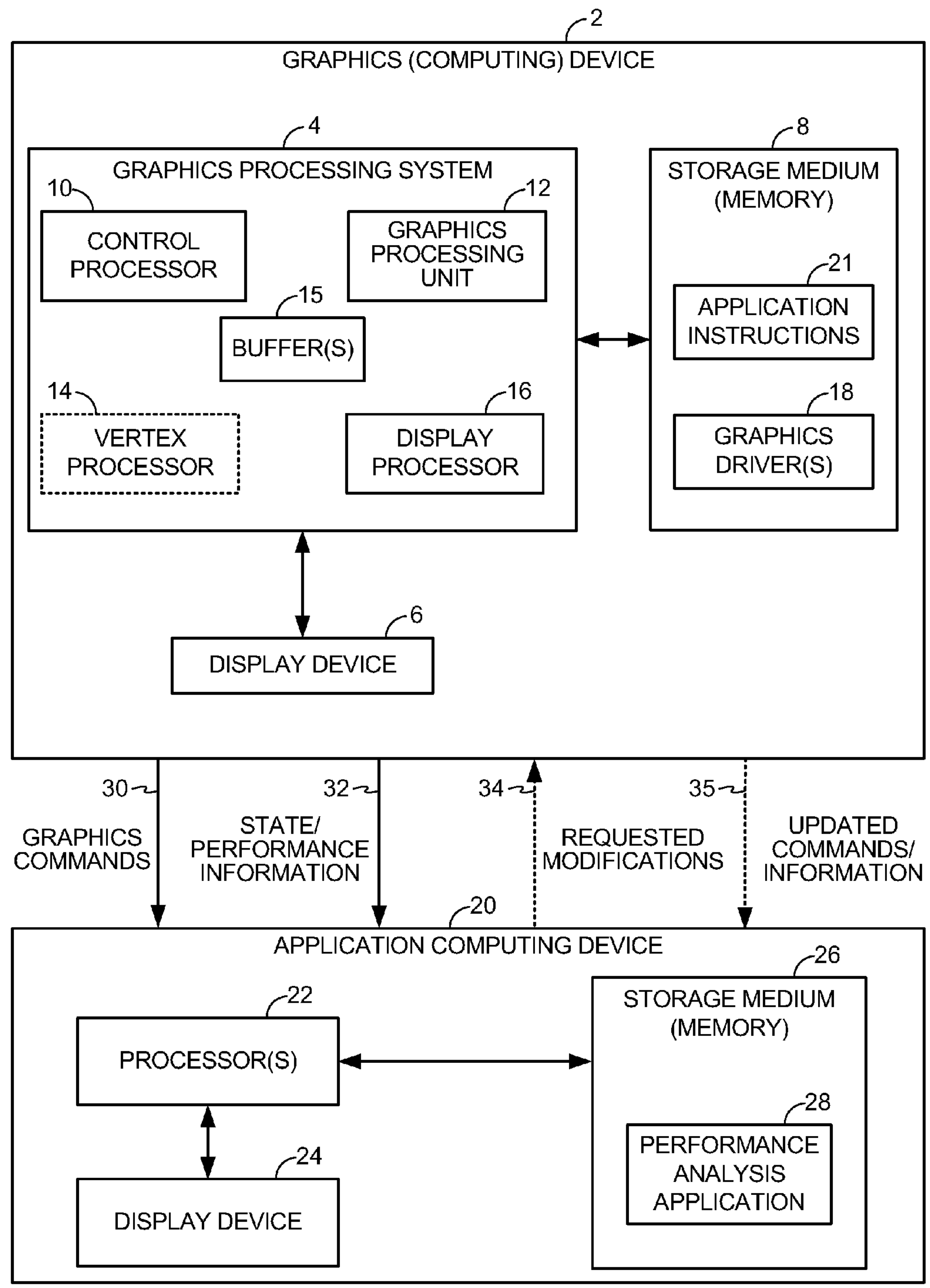
FIG. 1 is a block diagram illustrating an example of a graphics device that may provide graphics commands, along with state and/or performance information, to an application computing device executing a performance analysis application.

FIG. 1 is a block diagram illustrating a graphics device 2 that may provide graphics commands 30, along with state and/or performance information 32, to an application computing device 20 executing a performance analysis application, according to one aspect of the disclosure. Graphics device 2 may be a stand-alone device or may be part of a larger system. For example, graphics device 2 may form part of a wireless communication device, such as a wireless mobile communication handset, or may be part of a digital camera, video camera, digital multimedia player, personal digital assistant (PDA), video game console, other video device, or a dedicated viewing station, such as a television.

Graphics device 2 may comprise a computing device, and may also be part of a personal computer or a laptop device. Graphics device 2 may also be included in one or more integrated circuits, or chips/chipsets, which may be used in some or all of the devices described above. FIG. 1 shows an example of performance analysis application 28 being executed in a device 20 that is separate and distinct from graphics device 2. In other cases, such as in the example shown in FIG. 2, a performance analysis application may also be executed or implemented directly within a graphics device, as described in more detail with reference to FIG. 2.

In some cases, graphics device 2 may be capable of executing or implementing various applications, such as graphics applications, video applications, audio applications, and/or other multimedia applications. For example, graphics device 2 may be used for graphics applications, video game applications, video playback applications, digital camera applications, instant messaging applications, video teleconferencing applications, mobile applications, or video streaming applications.

Graphics device 2 may be capable of processing a variety of different data types and formats. For example, graphics device 2 may process still image data, moving image (video) data, or other multimedia data, as will be described in more detail below. The image data may include computer-generated graphics data. In the example of FIG. 1, graphics device 2 includes a graphics processing system 4, a storage medium 8, which comprises memory, and a display device 6.

Processors 10, 12, 14, and 16 may be included within graphics processing system 4. Processor 10 is a control, or general-purpose, processor. Processor 12 is a graphics processor, processor 14 is a vertex processor, and processor 16 is a display processor. Control processor 10 may be capable of controlling graphics processing unit 12, vertex processor 14, and/or display processor 16. In one example, graphics processing system 4 may include other processors, including other media processors (e.g., an audio engine). In some cases, graphics processing system 4 may not include vertex processor 14 when graphics device 2 does not provide vertex processing capabilities (e.g., if graphics device 2 does not implement processing for OpenVG).

In graphics device 2, graphics processing system 4 is coupled both to storage medium 8 and to display device 6. Storage medium 8 may include any permanent or volatile memory that is capable of storing instructions and/or data. Storage medium 8 may comprise synchronous dynamic random access memory (SDRAM), read-only memory (ROM), non-volatile random access memory (NVRAM), embedded dynamic random access memory (eDRAM), static random access memory (SRAM), or flash memory. Display device 6 may be any device capable of displaying image data for display purposes, such as an LCD (liquid crystal display), plasma display device, or other display device.

Vertex processor 14 is capable of managing vertex information and processing vertex transformations. In one example, vertex processor 14 may comprise a digital signal processor (DSP). Graphics processing unit 12 may be a dedicated graphics rendering device utilized to render, manipulate, and display computerized graphics. Graphics processing unit 12 may implement various complex graphics-related algorithms. For example, the complex algorithms may correspond to representations of two-dimensional or three-dimensional computerized graphics. Graphics processing unit 12 may implement a number of so-called "primitive" graphics operations, such as forming points, lines, and triangles or other polygon surfaces, to create complex, three-dimensional images on a display, such as display device 6.

Graphics processing unit 12 may carry out commands that are stored in storage medium 8. Storage medium 8 is capable of storing application instructions 21 for an application, such as a graphics or video application, as well as one or more graphics drivers 18. Application instructions 21 may be loaded from storage medium 8 into graphics processing system 4 for execution. For example, one or more of control processor 10, graphics processing unit 12, and display processor 16 may execute instructions 21. In one example, application instructions 21 may comprise one or more downloadable modules that are downloaded dynamically, over the air, into storage medium 8. In one example, application instructions 21 may comprise a call stream of binary instructions that are generated or compiled from application programming interface (API) instructions created by an application developer.

Graphics drivers 18 may also be loaded from storage medium 8 into graphics processing system 4 for execution. For example, one or more of control processor 10, graphics processing unit 12, and display processor 16 may execute certain instructions from graphics drivers 18. In one example aspect, graphics drivers 18 are loaded and executed by graphics processing unit 12. Graphics drivers 18 will be described in further detail below.

As also shown in FIG. 1, graphics processing system 4 includes one or more buffers 15. Control processor 10, graphics processing unit 12, vertex processor 14, and/or display processor 16 each have access to buffers 15, and may store data in or retrieve data from buffers 15. Buffers 15 may comprise cache memory, and may be capable of storing both data and instructions. For example, buffers 15 may include one or more of application instructions 21 or one or more instructions from graphics drivers 18 that have been loaded into graphics processing system 4 from storage medium 8. Buffers 15 and/or storage medium 8 may also contain graphics data used during instruction execution.

Applications instructions 21 may, in certain cases, include instructions for a graphics application, such as a 3D graphics application. Application instructions 21 may comprise instructions that describe or define contents of a graphics scene that includes one or more graphics objects. When application instructions 21 are loaded into and executed by graphics processing system 4, graphics processing system 4 may undergo a series of state transitions. One or more instructions within graphics drivers 18 may also be executed to render or display rendered graphics elements on display device 6 during executing of application instructions 21. Each individual element may be rendered during execution of a particular draw command, which causes the rendered element to be drawn on a display.

A full set of states for an instruction, such as a draw call, may describe a process with which an element is rendered by the draw call (or command) within graphics processing system 4. However, an application developer who has written application instructions 21 may often have limited ability to interactively view or modify these states for purposes of debugging or experimenting with alternate methods of describing or rendering elements in a defined scene. In addition, different hardware platforms may have different hardware designs and implementations of these states and/or state transitions.

Thus, in one example, an application developer may use application computing device 20, shown in FIG. 1, to assist in the processing of debugging and experimenting with alternate methods for describing or rendering images in a scene. Application computing device 20 is coupled to graphics device 2. For example, in one example, application computing device 20 is coupled to graphics device 2 via a Universal Serial Bus (USB) connection. In other aspects, other types of connections, such as wireless or other forms of wired connections, may be used.

Application computing device 20 includes one or more processors 22, a display device 24, and a storage medium 26. Processors 22 may include one or more of a control processor, a graphics processor, a vertex processor, and a display processor, according to one aspect. Storage medium 26 may include any permanent or volatile memory that is capable of storing instructions and/or data. Storage medium 26 may comprise synchronous dynamic random access memory (SDRAM), read-only memory (ROM), non-volatile random access memory (NVRAM), static random access memory (SRAM), or flash memory. Display device 24 may be any device capable of displaying image data for display purposes, such as an LCD (liquid crystal display), plasma display device, or other display device.

In the development of certain applications, such as embedded, hardware-accelerated graphics applications, it is often difficult or impossible to quantify many aspects of how individual graphics elements (e.g., meshes, polygons, or other graphical primitives) are processed by graphics processing unit 12 on graphics device 2. Such aspects of graphics processing, such as, for instance, the number of clock cycles devoted to the element in graphics processing unit 12, stalls incurred in its rendering, memory bandwidth consumed, etc., may comprise highly valuable information for an application developer, yet are typically unavailable during actual application development. Without having detailed insight into the detailed activity of graphics processing unit 12, a developer may miss opportunities for optimization, misdirect tuning efforts, and/or be forced to degrade visual quality in order to meet performance targets and schedules.

Thus, as shown in FIG. 1, application computing device 20 is capable of capturing and analyzing graphics commands 30, along with state and/or performance information 32, which is sent from graphics device 2. In one example, graphics drivers 18 are configured to send graphics commands 30 and state/performance information 32 to application computing device 20. Graphics commands 30 may include one or more of application instructions 21, and state/performance information 32 may be generated or captured during execution or implementation of graphics commands 30 within graphics processing system 4.

State/performance information 32 includes information about the state and performance of graphics processing system 4 during instruction execution or implementation, and will be described in more detail below. State/performance information 32 may include graphics data (e.g., primitive and/or rasterized graphics data) that may be used, or is otherwise associated, with graphics commands 30. Graphics processing system 4 may execute graphics commands 30 to display an image, or a scene of rendered graphics elements, on display device 6. Application computing device 20 is capable of using graphics commands 30, along with state/performance information 32, to create the graphics image or scene that may, in some cases, also be shown on display device 6 of graphics device 2.

Performance analysis application 28 may be executed by processors 22 of application computing device 20 to create the graphics image or scene of rendered elements upon receipt of graphics commands 30 and state/performance information 32, and display the rendered elements on display device 24. Performance analysis application 28 may comprise a software module that contains a number of application instructions. Performance analysis application 28 is stored in storage medium 26, and may be loaded and executed by processors 22. Performance analysis application 28 may be pre-loaded into storage medium 26, and may be customized to operate with graphics device 2. In one example, performance analysis application 28 simulates the hardware operation of graphics device 2 and provides graphical information that may represent one or more aspects of state/performance information 32.

Different versions of performance analysis application 28 may be stored in storage medium 26 and executed by processors 22 for different graphics devices having different hardware designs. In some cases, software libraries may also be stored within storage medium 26, which are used in conjunction with performance analysis application 28. In one example, performance analysis application 28 may be a generic application, and specific hardware or graphics device simulation functionality may be included within each separate library that may be linked with performance analysis application 28 during execution.

For example, a first library may provide simulation functionality for a first specific type of graphics device (e.g., one contained within a first type of wireless communication handset), while a second, different library may provide simulation functionality for a second, different type of graphics device that has a different hardware architecture that the first graphics device. Each of these libraries may be stored within storage medium 26, and may be separately linked in with performance analysis application 28 during execution to simulate either the first or second graphics device. As a result, performance analysis application 28, or different versions of such an application upon execution, is capable of simulating various different types of graphics device on application computing device 20.

In one example, a visual representation of state/performance information 32 may be displayed to application developers on display device 24 of application computing device 20. In addition, a visual representation of graphics commands 30 may also be displayed. Because, in many cases, graphics commands 30 may comprise binary instructions, application computing device 20 may use performance analysis application 31 to generate the visual representation of graphics commands 30 on display device 24. Performance analysis application 31 is stored within storage medium 26 and may be loaded into processors 22 in order to display a visual representation of graphics commands 30.

In one example, performance analysis application 31 may provide functionality to map graphics commands 30 to corresponding API instructions that may have been previously compiled when generating graphics commands 30. Application developers may write programs that use API instructions, but these API instructions are typically compiled into binary instructions, such as graphics commands 30, for execution on graphics device 2.

One or more instructions within graphics commands 30 may be mapped to an individual API instruction. The mapped API instructions may then be displayed to an application developer on display device 24 to provide a visual representation of the graphics commands 30 that are actually being executed. In some cases, performance analysis application 28 may utilize mapping information in order to perform such mapping. Such mapping information may be stored, for instance, within storage medium 26. The mapping information may be provided, in some cases, from graphics device 2, and may also be pre-programmed on application computing device 20 in other cases.

In one example, a user, such as an application developer, may wish to change one or more of the graphics commands 30 to determine, for example, the effects of such changes on performance. In such cases, application computing device 20 may optionally provide requested modifications 34, such as modifications to commands that are to be executed, to graphics device 2, as will be described in more detail below.

As described above, the graphics image or set or rendered elements displayed on display device 24 may also be displayed on graphics device 2. Because performance analysis application 28 may use graphics commands 30 and state/performance information 32 to create a scene of rendered graphics elements exactly as presented on graphics device 2, application developers that use application computing device 20 may be able to quickly identify potential performance issues or bottlenecks during execution of graphics applications 30, and even prototype modifications to improve the overall performance of graphics applications 30.

For example, an application developer may optionally choose to make one or more requested modifications 34 to graphics commands 30 and/or state/performance information 32 during execution of performance analysis application 28 on application computing device 20 and display of the image on display device 24. Any such requested modifications 34 may be based upon observed performance issues, or bottlenecks, during execution of graphics commands 30 or analysis of state/performance information 32. These requested modifications 34 may then be sent from application computing device 20 to graphics device 2, where they are processed by graphics processing system 4. In one example, one or more of graphics drivers 18 are executed within graphics processing system 4 to process requested modifications 34. Requested modifications 34, in some cases, may include modified commands. In some cases, requested modifications may include modified state and/or performance information.

Upon processing of requested modifications 34, updated instructions and/or information 35 is sent back to application computing device 20, such as by one or more of graphics drivers 18. Updated commands/information 35 may include updated graphics instructions for execution based upon requested modifications 34 that were processed by graphics device 2. Updated commands/information 35 may also include updated state and/or performance information based upon the requested modifications 34 that were processed by graphics device 2.

The updated commands/information 35 is processed by performance analysis application 28 to update the display of the image information or rendered graphics elements on display device 24, and also may provide a visual representation of updated commands/information 35 to the application developer, which may include again using performance analysis application 31. The application developer may then view the updated image information on display device 24, as well as the visual representation of updated commands/information 35, to determine if the performance issues have been resolved or mitigated. The application developer may use an iterative process to debug graphics commands 30 or prototype modifications to improve the overall performance graphics applications 30.

Thus, performance profiling application 28 may be used as an application development tool by content developers (e.g., video game developers) who are writing multimedia applications for embedded platforms that make use of certain APIs, such as OpenGL®, OpenGL® ES, or OpenVG APIs. The use of performance analysis application 28 may allow an application developer to measure and visualize a large set of properties of the processing of individual 2D or 3D elements by the graphics processing hardware of graphics processing unit 12. Information gleaned from this may help the developer more effectively tune design or performance characteristics of the application in order to run more efficiently on a targeted hardware platform (e.g., platform provided by graphics device 2 in FIG. 1).

Performance analysis application 28 enables the capture of one or more large sets of performance measurements from graphics device 2 per each individual rendered element (e.g., per draw command, per graphics primitive, per vertex, per pixel fragment). Performance analysis application 28 may allow the developer to graphically visualize performance metrics on a development device, such as application computing device 20, based upon performance measurements (e.g., state/performance information 32) received from graphics device 2. In some cases, each draw command is capable of rendering, during execution, of one or more graphics primitives, vertices, pixel fragments, or any portions/combinations thereof.

For example, when a draw command included within application instructions 21 is executed by graphics processing unit 12, one or more of graphics drivers 18 may obtain the values of one or more counters of graphics processing unit 12 that encompasses the work performed by graphics processing unit 12 in order to execute the draw command. One or more of these counters may comprise a low-level hardware counter that may be sampled and aggregated with other counters or measurements from graphics processing unit 12 or other components of graphics processing system 4, such that performance analysis application 28 can compute the high-level performance metrics. The counter values may be included within state/performance information 32 that is sent to application computing device 20. State/performance information 32 may further include data needed by performance analysis application 28 to recreate graphics commands 30 in an emulation environment, including function call parameters, render state, geometrical data, textures, shaders, and the like.

In one aspect of the disclosure, performance analysis application 28, during execution, may receive performance information (e.g., included within state/performance information 32) that has been provided by graphics processing unit 12. The performance information has been measured by graphics processing unit 12 is association with individual graphics elements for rendering a graphics scene. For example, the graphics elements may be draw commands (e.g., commands included within application instructions 21) to render a graphics scene. In some cases, the graphics elements may comprise graphics primitives, vertices, and/or pixel fragments.

Upon receipt of the performance information, performance analysis application 28 may compute values of a performance metric for the graphics elements based upon the performance information, where each computed value is associated with at least one of the graphics elements. For example, as will be described further below, a specified performance metric may comprise a high-level performance measurement, such as a metric for pixels written per clock cycle, a metric for shader instructions issued per vertex, and/or a metric for the number of memory writes executed per second, to name only a few examples.

As will also be described further below, performance analysis application 28 may assign graphical identifiers (e.g., colors, shading/cross-hatching identifiers, other graphical identifiers) to each of the graphics elements based upon the computed values of the performance metric for the graphics elements, and may process the graphics elements to render the graphics scene for purposes of display, such as on display device 24. One of the graphics identifiers may be assigned to each of the graphics elements. In such fashion, performance analysis application 28 is capable of displaying rendered graphics elements during processing of the graphics elements (e.g., during execution of draw commands) and visually displaying such elements according to the graphical identifiers that are assigned to the graphics elements.

The display of such information may, in many cases, assist an application developer in directly and precisely measuring a large set of properties of the processing of individual graphics elements (e.g., 2D or 3D objects) by graphics processing unit 12 and easily viewing a representation of such measurements on display device 24. The displayed information may also help the developer more effectively tune design or performance characteristics of application instructions 21 to run more efficiently on the target hardware platform provided by graphics device 2.

For example, the developer may tune various aspects of the application to determine if any changes may improve one or more performance characteristics of the executed application upon inspection of an updated visual representation of performance metrics for rendered elements on display device 24. The developer may also utilize performance analysis application 28 to modify one or more of the commands, which are included within requested modifications 34 sent from application computing device 20 to graphics device 2, as described above. An updated display of performance metrics for the rendered elements may then be provided on display device 24 upon receipt of updated commands/information 35.

Figure 2:
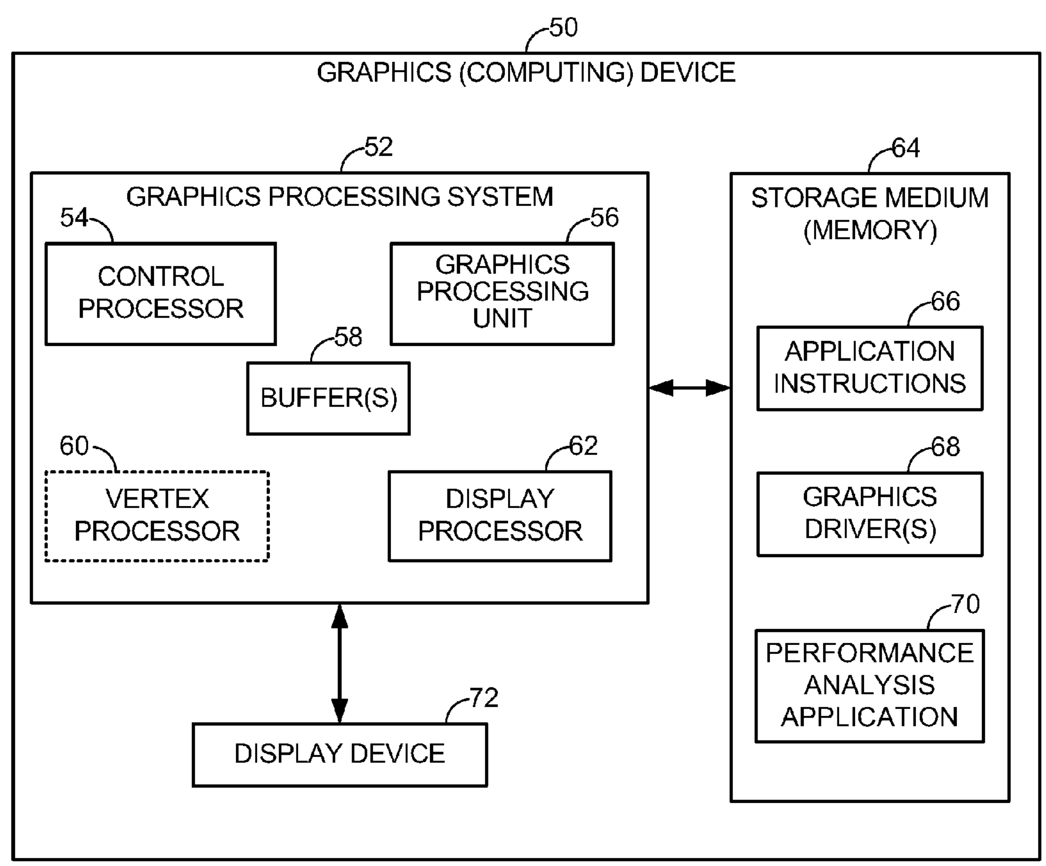
FIG. 2 is a block diagram illustrating another example of a graphics device that may directly implement or execute a performance analysis application.

FIG. 2 is a block diagram illustrating another example of a graphics device 50 that may directly implement or execute a performance analysis application 70. Similar to graphics device 2 shown in FIG. 1, graphics device 50 includes a graphics processing system 52, which is coupled to a display device 72 and a storage medium (e.g., memory) 64. Graphics device 50 may function similarly to graphics device 2, and may also comprise a computing device.

Graphics processing system 52 includes a control processor 54, a graphics processing unit 56, one or more buffers 58, an optional vertex processor 60, and a display processor 62. Graphics processing system 52 includes vertex processor 60 when system 52 provides vertex processing operations.

Storage medium 64, similar to storage medium 8 shown in FIG. 1, includes application instructions 66 and graphics drivers 68. However, unlike storage medium 8, storage medium 64 includes a performance analysis application 70, which may be loaded into and executed by one or more of the processors/units in graphics processing system 52.

Performance analysis application 70 may operate similarly to performance analysis application 28 shown in FIG. 1. However, in the example of FIG. 2, the same device (i.e., graphics device 50) that actually executes application instructions 66 within the device also executes performance analysis application 70. Hence, no separate application computing device is needed or shown in the example of FIG. 2.

Graphics device 50 of FIG. 2 may have various operational modes. For example, in a main mode, graphics processing system 52 may execute or implement application instructions 66 and/or graphics drivers 68 in a main operational mode, without the use of performance analysis application 70. However, in a different (e.g., test, emulation/simulation) mode, graphics processing system 52 may further execute or implement performance analysis application 70. A developer may be able to directly view the results and output of performance analysis application 70 in display device 72.

Thus, performance analysis application 70 may be used as an application development tool by content developers (e.g., video game developers) who are writing multimedia applications for embedded platforms that make use of certain APIs, such as OpenGL®, OpenGL® ES, or OpenVG APIs. The use of performance analysis application 70 may allow an application developer to measure and visualize a large set of properties of the processing of individual 2D or 3D elements by the graphics processing hardware of graphics processing unit 56 directly on display device 72. Information gleaned from this may help the developer more effectively tune design or performance characteristics of the application in order to run more efficiently on a targeted hardware platform (e.g., platform provided by graphics device 50 in FIG. 2).

Performance analysis application 70 enables the capture of one or more large sets of performance measurements from graphics device 50 per each individual rendered element (e.g., per draw command, per graphics primitive, per vertex, per pixel fragment). Performance analysis application 70 may allow the developer to graphically visualize performance metrics directly on graphics device 50, without the need for another, separate application computing device, based upon performance measurements received from graphics processing unit 56.

In one aspect, outgoing pixel fragments can obtain their values directly from performance counter data, such as performance counter data provided by graphics processing unit 56, during the implementation or execution of performance analysis application 70. In some cases, a fragment shader engine implemented by graphics processing system 52 (e.g., by graphics processing unit 56 and/or display processor 62) could be given access to one or more performance counters by exposing special registers to shader code. Pixel fragment values may be based upon, or derived from, the data in the special registers. Blending hardware in graphics processing system 52 may accumulate or combine those pixel fragments upon a frame buffer, since multiple pixel fragments can be located at the same screen coordinate. Thus, graphical identifiers (e.g., colors, cross-hatching/shading patterns) that are assigned to the pixel fragments may be determined by using blending to combine multiple ones of the pixel fragments based upon values of one or more of the counters (e.g., counters of graphics processing unit 56).

Figure 3:
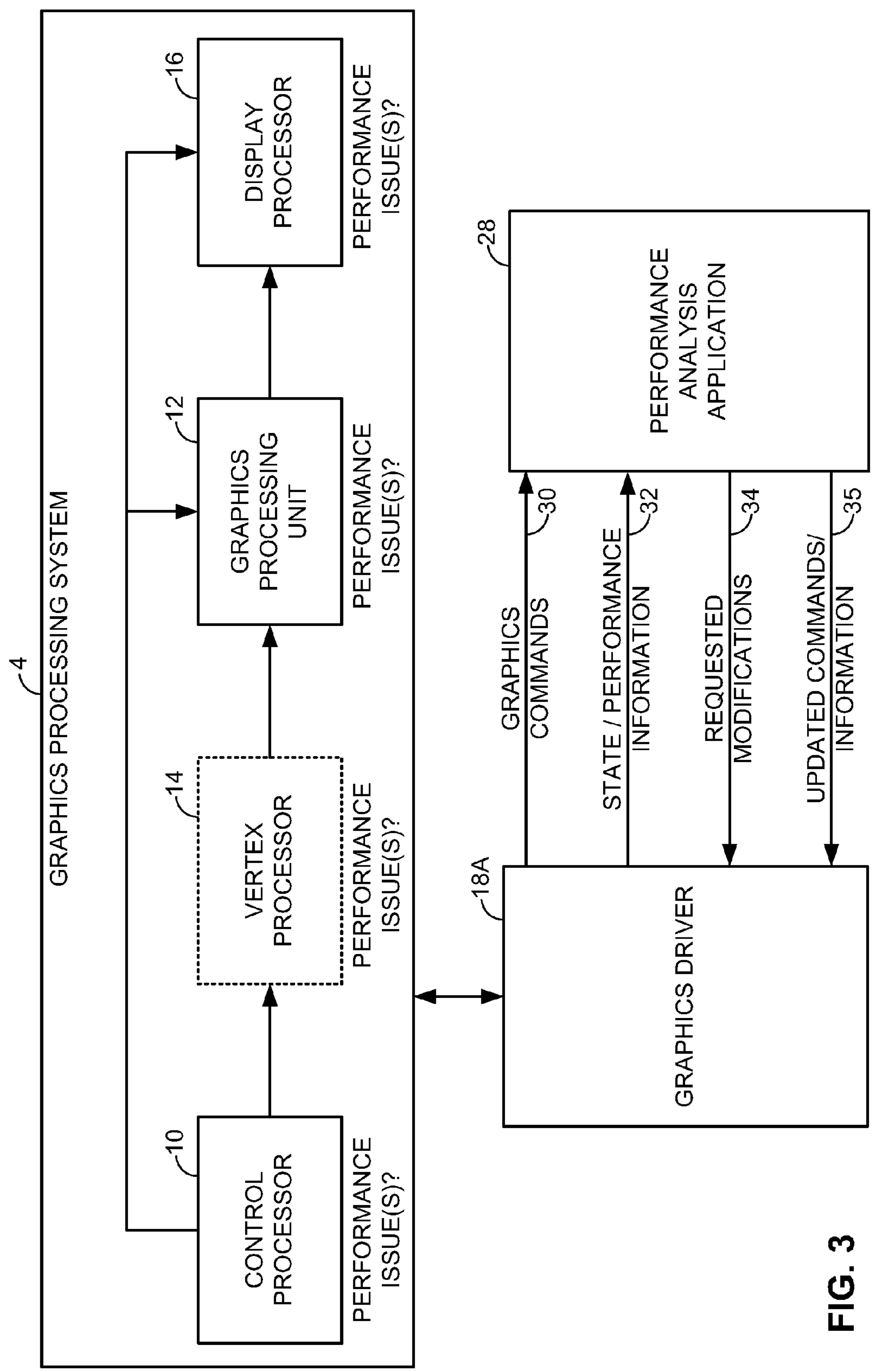
FIG. 3 is a block diagram illustrating additional details of the graphics processing system shown in FIG. 1, according to one example.

FIG. 3 is a block diagram illustrating certain details of graphics processing system 4, graphics driver 18, and application computing device 20 shown in FIG. 1, according to one example. In FIG. 3, it is assumed that application computing device 20 is coupled to graphics processing system 4 of graphics device 2. However, this is shown for illustration purposes only. In other scenarios, a performance analysis application may be implemented directly within a device (e.g., such as in the example of FIG. 2).

As shown in FIG. 3, graphics processing system 4 includes four programmable processors: control processor 10, optional vertex processor 14, graphics processing unit 12, and display processor 16, which are also shown in FIG. 1. Control processor 10 may control any of vertex processor 14, graphics processing unit 12, or display processor 16. In many cases, these processors 10, 12, 14, and 16 may be part of a graphics processing pipeline within system 4.

Control processor 10 may control one or more aspects of the flow of data or instruction execution through the pipeline, and may also provide geometry information for a graphics image to vertex processor 14. The optional vertex processor 14 may manage vertex transformation or geometry processing of the graphics image, which may be described or defined according to multiple vertices in primitive geometry form. When utilized, vertex processor 14 may provide its output to graphics processing unit 12, which may perform rendering or rasterization operations on the graphics image. Graphics processing unit 12 may provide its output to display processor 16, which prepares the graphics image, in pixel form, for display. Graphics processing unit 12 may also perform various operations on the pixel data, such as shading or scaling.

Often, graphics image data may be processed in this processing pipeline during execution of graphics commands 30, which may be part of application instructions 21 (FIG. 1). As a result, graphics commands 30 may be executed by one or more of control processor 10, vertex processor 14, graphics processing unit 12, and display processor 16. Application developers may typically not have much knowledge or control of which particular processors within graphics processing system 4 execute which ones of graphics commands 30. In some cases, one or more of control processor 10, vertex processor 14, graphics processing unit 12, and display processor 16 may have performance issues, or serve as potential bottlenecks within the processing pipeline, during the execution of graphics commands 30. In these cases, overall performance within graphics processing system 4 may be deteriorated, and the application developer may wish to make changes to the graphics commands 30 to improve performance. However, the developer may not necessarily know which ones of processors 10, 12, 14, or 16 may be the ones that have performance issues.

To assist with the problem of identifying performance bottlenecks and potential solutions, the graphics driver 18A of graphics device 2 may capture, or collect, graphics commands 30 from graphics processing system 4 and route them to application computing device 20, as shown in FIG. 3. Graphics driver 18A is part of graphics drivers 18 shown in FIG. 1. Graphics driver 18A may be loaded and executed by one or more of control processor 10, vertex processor 14, graphics processing unit 12, and display processor 16. In addition, graphics driver 18A may also collect state and/or performance information 32 from one or more of control processor 10, vector processor 14, graphics processing unit 12, and display processor 16 and route this information 32 to application computing device 20, as well. In one example, graphics driver 18A may comprise an OpenGL ES driver when graphics commands 30 include binary instructions that may have been generated or compiled from OpenGL ES API instructions.

Various forms of state data may be included within state/performance information 32. For example, the state data may include graphics data used during execution of, or otherwise associated with, graphics commands 30. The state data may be related to a vertex array, such as position, color, coordinates, size, or weight data. State data may further include texture state data, point state data, line state data, polygon state data, culling state data, alpha test state data, blending state data, depth state data, stencil state data, or color state data. As described previously, state data may include both state information and actual data. In some cases, the state data may comprise data associated with one or more OpenGL tokens.

Various forms of performance data may also be included within state/performance information 32. In general, this performance data may include metrics or hardware counter data from one or more of control processor 10, vertex processor 14, graphics processing unit 12, and display processor 16. The performance data may include frame rate or cycle data. The cycle data may include data for cycles used for profiling, command arrays, vertex and index data, or other operations. In various aspects, various forms of state and performance data may be included within state/performance information 32 that is collected from graphics processing system 4 by graphics driver 18A. In some examples, the performance data may also comprise counter data provided by graphics processing unit 12.

As described previously, application computing device 20 may display a representation of a graphics image according to received graphics commands 30 and state/performance information 32. Application computing device 20 may also display a visual representation of state/performance information 32. By viewing and interacting with the re-created graphics image and/or the visual representation of the state/performance information 32, an application developer may be able to quickly identify and resolve performance issues within graphics processing system 4 of graphics device 2 during execution of graphics commands 30. For example, the application developer may be able to identify which specific ones of processors 10, 12, 14, and/or 16 may have performance issues.

Performance analysis application 28 may be used as an application development tool by the application developers. In some examples, the use of performance analysis application 28 may allow an application developer to measure and visualize a large set of properties of the processing of individual 2D or 3D elements by the graphics processing hardware of graphics processing unit 12. Performance analysis application 28 enables the capture of one or more large sets of performance measurements for graphics processing system 4 per each individual rendered element (e.g., per draw command, per graphics primitive, per vertex, per pixel fragment).

Performance analysis application 28 may allow the developer to graphically visualize performance metrics on a development device, such as application computing device 20, based upon performance measurements received from graphics processing system 4. Information gleaned from this may help the developer more effectively tune design or performance characteristics of the application in order to run more efficiently on a targeted hardware platform (e.g., platform provided by graphics processing system 4).

In an attempt to identify a workaround or resolution to any identified performance issues, the developer may initiate one or more requested modifications 34 on application computing device 20. For example, the developer may interact with the re-created image or the representation of state/performance information 32 to create the requested modifications 34. In some cases, the developer may even directly change the state/performance information 32, as described in more detail below, to generate the requested modifications 34. In certain cases, requested modifications 34 may include one or more requests to disable execution of one or more of graphics commands 30 in graphics processing system 4 of graphics device 2, or requests to modify one or more of graphics commands 30.

Requested modifications 34 are sent from application computing device 20 to graphics driver 18A, which handles the requests for graphics device 2 during operation. In many cases, the requested modifications 34 may include requests to modify state information, which may include data, within one or more of processors 10, 12, 14, or 16 within graphics processing system 4 during execution of graphics commands 30. Graphics driver 18A may then implement the changes within graphics processing system 4 that are included within requested modifications 34. These changes may alter the flow of execution amongst processors 10, 12, 14, and/or 16 for execution of graphics commands 30. In certain cases, one or more of graphics commands 30 may be disabled during execution in graphics processing system 4 according to requested modifications 34.

Graphics driver 18A is capable of sending updated instructions and/or information 35 to application computing device 20 in response to the processing of requested modifications 34. Updated commands/information 35 may include updated state information collected from graphics processing system 4 by graphics driver 18A, including performance information. Updated commands/information 35 may also include updated graphics instructions.

Application computing device 20 may use updated commands/information 35 to display an updated representation of the graphics image, as well as a visual representation of updated commands/information 35, through execution or implementation of performance analysis application 28. Performance analysis application 28 may update the graphical representation of the performance metrics on a rendered-element basis for a graphics scene based upon the updated commands/information 35 received from graphics driver 18A. The application developer may then be capable of assessing whether the previously identified performance issues have been resolved or otherwise addressed. For example, the application developer may be able to analyze the updated image, as well as the visual representation of updated commands/information 35 to determine if certain textures, polygons, or other features have been optimized, or if other performance parameters have been improved.

In such fashion, the application developer may be able to rapidly and effectively debug or analyze execution of graphics commands 30 within an environment on application computing device 20 that simulates the operation of graphics processing system 4 on graphics device 2. The developer may iteratively interact with the displayed image and state/performance information on application computing device 20 to analyze multiple graphics images in a scene or multiple image frames to maximize execution performance of graphics commands 30.

Figure 4:
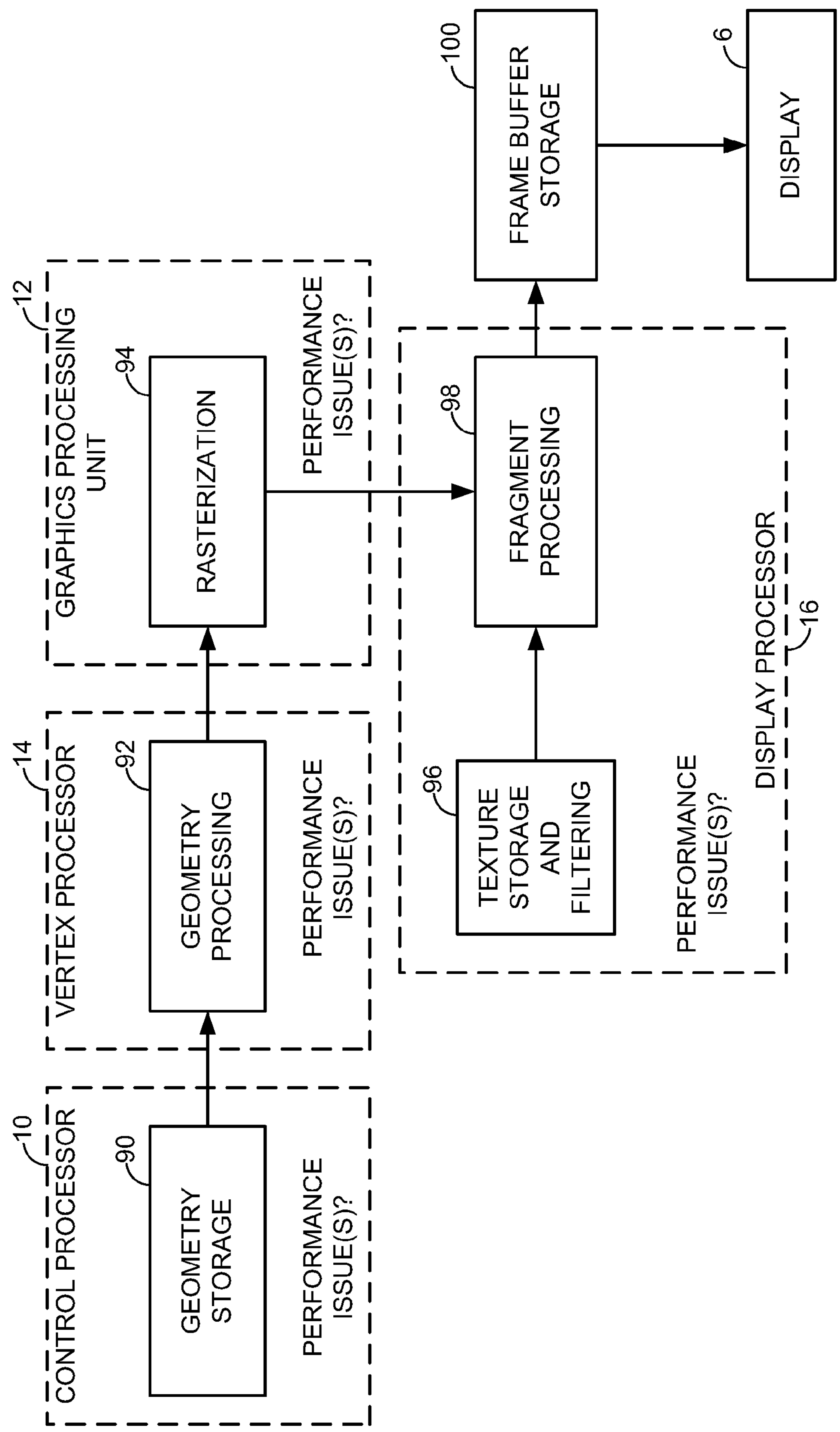
FIG. 4 is a flow diagram illustrating additional details of operations that may be performed by the control processor, graphics processor, vertex processor, and display processor shown in FIG. 1, according to one example.

FIG. 4 is a flow diagram illustrating additional details of operations that may be performed by control processor 10, graphics processing unit 12, vertex processor 14, and display processor 16, according to one aspect. FIG. 4 also shows operations for frame buffer storage 100 and display 6. In one example, control processor 10, vertex processor 14, graphics processing unit 12, and/or display processor 16 perform various operations as a result of execution of one or more of graphics commands 30.

As described previously, control processor 10 may control one or more aspects of the flow of data or instruction execution through the graphics processing pipeline, and may also provide geometry information to vertex processor 14. As shown in FIG. 4, control processor 10 may perform geometry storage at 90. In some cases, geometry information for one or more primitives may be stored by control processor 10 in buffers 15 (FIG. 1). In some cases, geometry information may be stored in storage medium 8.

Vertex processor 14, if used within the graphics device, may then obtain the geometry information for a given primitive provided by control processor and/or stored in buffers 15 for processing at 92. In certain cases, vertex processor 14 may manage vertex transformation of the geometry information. In certain cases, vertex processor 14 may perform lighting operations on the geometry information.

Vertex processor 14 may provide its output to graphics processing unit 12, which may perform rendering or rasterization operations on the data at 94. Graphics processing unit 12 may provide its output to display processor 16, which prepares one or more graphics images, in pixel form, for display. Display processor 16 may perform various operations on the pixel data, including fragment processing to process various fragments of the data, at 98. In certain cases, this may include one or more of depth testing, stencil testing, blending, or texture mapping, as is known in the art. When performing texture mapping, display processor 16 may incorporate texture storage and filtering information at 96. In some cases, graphics processor 16 may perform other operations on the rasterized data, such as shading or scaling operations.

Display processor 16 provides the output pixel information for storage into a frame buffer at 100. In some cases, the frame buffer may be included within buffers 15 (FIG. 1). In other cases, the frame buffer may be included within storage medium 8. The frame buffer stores one or more frames of image data, which can then be displayed on display device 6, such as on display device 6.

As described previously, graphics commands 30 may be executed by one or more of control processor 10, vertex processor 14, graphics processing unit 12, and display processor 16. Application developers may typically not have much knowledge or control of which particular processors within graphics processing system 4 execute which ones of graphics commands 30. In certain cases, one or more of control processor 10, vertex processor 14, graphics processing unit 12, and display processor 16 may have performance issues, or serve as potential bottlenecks within the processing pipeline, during the execution of graphics commands 30.

It may often be difficult for an application developer to pinpoint the location of a bottleneck, or how best to resolve or mitigate the effects of such a bottleneck. Thus, in one example, graphics commands 30 and/or state information may be provided from graphics device 2 to an external computing device, such as application computing device 20. The state information may include data from one or more of control processor 10, vertex processor 14, graphics processing unit 12, and display processor 16 with respect to various operations, such as those shown in FIG. 4, that occur during the execution of graphics commands 30. Application computing device 20 may create a graphics image that is shown on device 2 in order to help identify and resolve bottlenecks in an efficient and effective manner.

Figure 5:
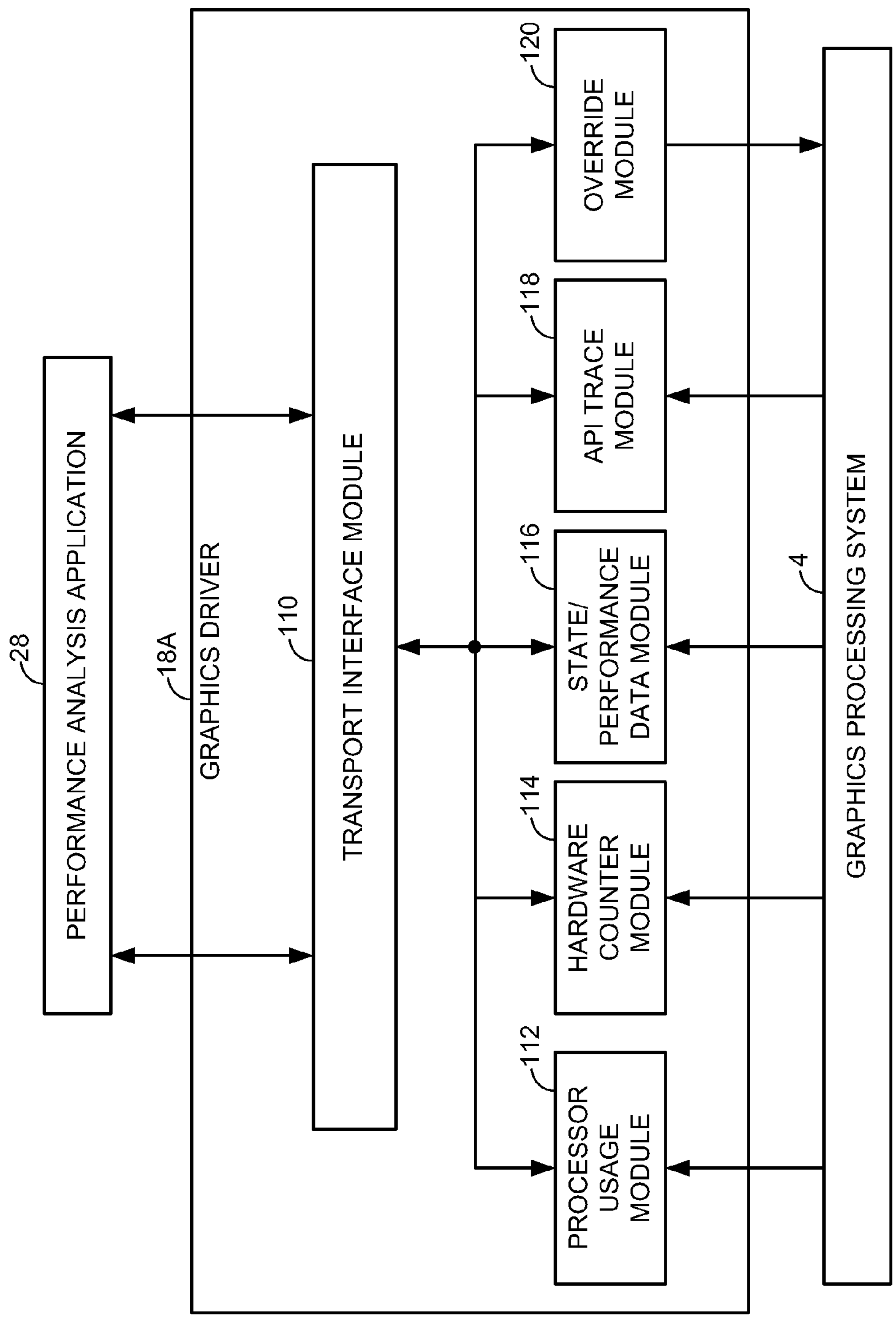
FIG. 5 is a block diagram illustrating additional details of the graphics driver shown in FIG. 3, according to one example.

FIG. 5 is a block diagram illustrating additional details of graphics driver 18A shown in FIG. 3, according to one example. As described previously, graphics driver 18A may comprise instructions that can be executed within graphics processing system 4, such as, for example, by one or more of control processor 10, vertex processor 14, graphics processing unit 12, and display processor 16. Execution of graphics driver 18A allows graphics processing system 4 to communicate with application computing device 20. In one example, graphics driver 18A may comprise instructions that can be executed within graphics processing unit 12, and may allow the various state and performance information to be provided by graphics processing system 4 to performance analysis application 28.

Graphics driver 18A, when executed, may include various functional blocks, which are shown in FIG. 5 as examples of transport interface 110, processor usage module 112, hardware counter module 114, state/performance data module 116 that can manage other state and/or performance data, API trace module 118, and override module 120. Graphics driver 18A uses transport interface module 110 to communicate with performance analysis application 28 of application computing device 20.

Processor usage module 112 collects and maintains processor usage information for one or more of control processor 10, vertex processor 14, graphics processing unit 12, and display processor 16. The processor usage information may include processor cycle and/or performance information. Cycle data may include data for cycles used for profiling, command arrays, vertex and index data, or other operations. Processor usage module 112 may then provide such processor usage information to application computing device 20 via transport interface module 110. In some cases, processor usage module 112 provides this information to device 20 as it receives the information, in an asynchronous fashion. In other cases, processor usage module 112 may provide the information upon receipt of a request from performance analysis application 28.

Hardware counter module 114 collects and maintains various hardware counters during execution of instructions by one or more of control processor 10, graphics processing unit 12, vertex processor 14, or display processor 16. The counters may keep track of various state indicators and/or metrics with respect to instruction execution within graphics processing system 4. Hardware counter module 114 may provide information to device 20 asynchronously or upon request. In particular, hardware counter module 114 may capture various counter values from graphics processing unit 12 and provide such values, as performance information associated with execution of commands by graphics processing unit 12, to performance analysis application 28.

State/performance data module 116 collects and maintains other state and/or performance data for one or more of control processor 10, graphics processing unit 12, vertex processor 14, and display processor 16 in graphics processing system 4. For example, the state data may, in some cases, comprise graphics data. The state data may include data related to a vertex array, such as position, color, coordinates, size, or weight data. State data may further include texture state data, point state data, line state data, polygon state data, culling state data, alpha test state data, blending state data, depth state data, stencil state data, or color state data. Performance data may include various other metrics or cycle data. State/performance data module 116 may provide information to performance analysis application 28 asynchronously or upon request.

API trace module 118 manages a flow and/or trace of graphics instructions that are executed by graphics processing system 4 and transported to performance analysis application 28 via transport interface module 110. As described previously, graphics device 2 provides a copy of graphics commands 30, which are executed by graphics processing system 4 in its processing pipeline, to device 20. API trace module 118 manages the capture and transport of these graphics commands 30. API trace module 118 may also provide certain information used with performance analysis application 31 (FIG. 1) to map graphics commands 30 to a visual representation of graphics commands 30, such as API instructions that may have been used to generate graphics commands 30.

In one example, state/performance information 32 (e.g., FIG. 1) sent from graphics device 2 to application computing device 20 may include any of the data or information provided by processor usage module 112, hardware counter module 114, and/or state/performance data module 116. In one example, graphics commands 30 (e.g., FIG. 1) sent form graphics device 2 to application computing device 20 may include information provided by API trace module 118.

Override module 120 allows graphics driver 18A to change, or override, the execution of certain instructions within graphics processing system 4. As described previously, performance analysis application 28 may send one or more requested modifications, such as modifications 34, to graphics device 2. In certain cases, requested modifications 34 may include one or more requests to disable execution of one or more of graphics commands 30 in graphics processing system 4, or requests to modify one or more of graphics commands 30. In some cases, requested modifications 34 may include requests to change state/performance information 32.

Override module 120 may accept and process requested modifications 34. For example, override module 120 may receive from performance analysis application 28 any requests to modify one or more of graphics commands 30, along with any requests to modify state/performance information 32, and send such requests to graphics processing system 4. One or more of control processor 10, graphics processing unit 12, vertex processor 14, and display processor 16 may then process these requests and generate updated commands/information 35. Override module 120 may then send updated commands/information 35 to performance analysis application 28 for processing, as described previously.

In such fashion, graphics driver 18A provides an interface between graphics processing system 4 and performance analysis application 28 of application computing device 20. Graphics driver 18A is capable of providing graphics instructions and state/performance information 32 to performance analysis application 28, and also receiving requested modifications 34 from performance analysis application 28. After processing such requested modifications 34, graphics driver 18A is subsequently able to provide updated commands/information 35 back to performance analysis application 28.

Figure 6:
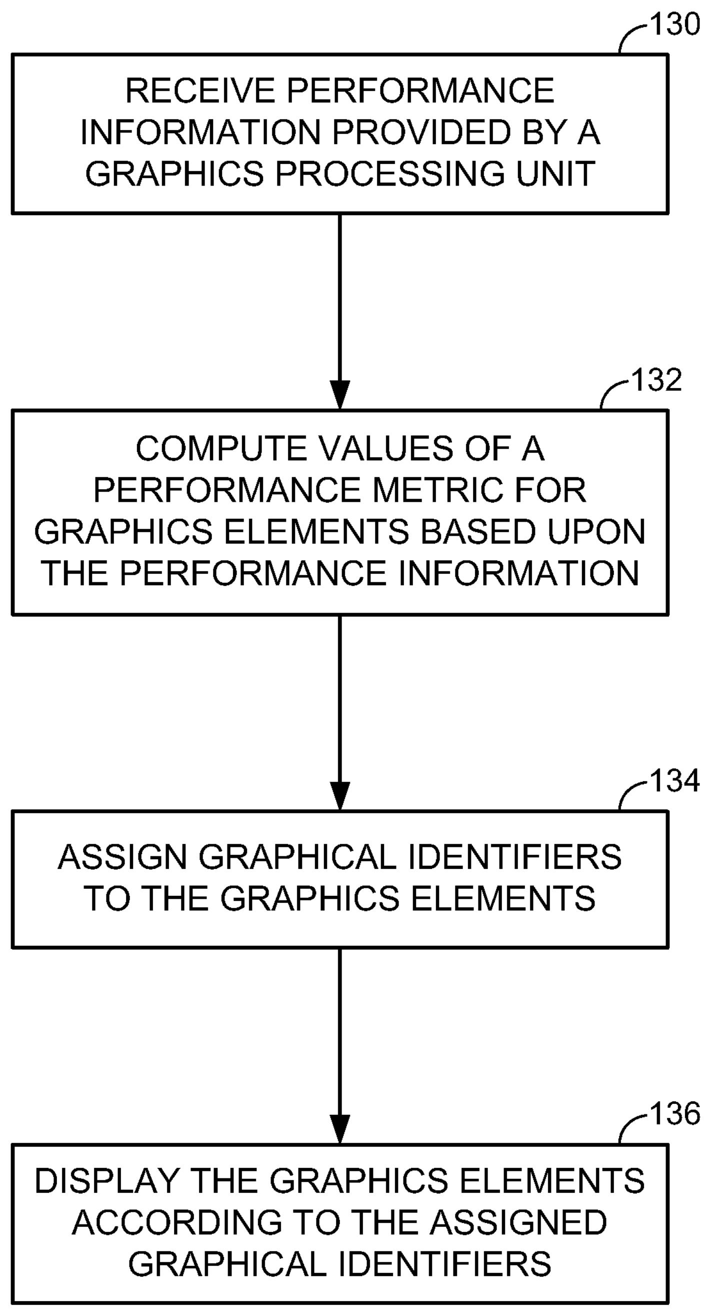
FIG. 6 is a flow diagram of an example method that may be performed by the graphics device shown in FIG. 1 or FIG. 2.

FIG. 6 is a flow diagram of a method that may be performed by application computing device 20 shown in FIG. 1 or graphics device 50 shown in FIG. 2, according to one aspect of the disclosure. For purposes of illustration only, it will be assumed in the subsequent description that the method of FIG. 6 is performed by a performance analysis application, such as performance analysis application 28 of application computing device 20 (FIG. 1) or performance analysis application 70 (FIG. 2).

The performance analysis application may receive performance information provided by a graphics processing unit (e.g., graphics processing unit 12 of graphics device 2), wherein the performance information has been measured by the graphics processing unit in association with individual graphics elements for rendering a graphics scene (130). For example, the performance information may be part of the state/performance information 32, shown in FIG. 1, which is provided to application computing device 20. The performance information may be associated with execution of certain draw commands included within graphics commands 30. Graphics commands 30 may comprise binary instructions that are generated from API instructions.

The performance information, in some examples, may comprise performance counter data collected by the graphics processing unit. For example, the performance counter data may include counter values for the number of culled or clipped graphics primitives as draw commands are being executed by the draw commands. Various other forms of performance counter data may also be collected. Various other forms of performance counter data may also be collected, including but not limited to the following: number of hardware clock cycles per frame, draw command, primitive, vertex, or fragment; number of idle or stalled cycles within one or more subcomponents of a graphics device (e.g., graphics device 2) per frame, draw command, primitive, vertex, or fragment; and the like.

The performance analysis application may then compute values of a performance metric for the graphics elements based upon the performance information (132). Each computed value is associated with at least one of the graphics elements. The performance analysis application may compute values for any number of different performance metrics. Example performance metrics may include, for instance, the number of pixels written per clock cycle, the number of shader instructions issued per vertex, the number of memory writes executed per second, and the like. The performance analysis application may calculate values for these metrics based upon the received performance information.

The performance analysis application may assign graphical identifiers to the graphics elements based upon the computed values of the performance metric for the graphics elements (134), where one of the graphical identifiers is assigned to each of the graphics elements. The performance analysis application may then display (e.g., on display device 24) the individual graphics elements, when rendering the graphics scene, according to the graphical identifiers that are assigned to the graphics elements (136).

The performance information may comprise values of one or more counters that are collected and provided by the graphics processing unit for each of the graphics elements. Each of the graphics elements may comprise one or more draw commands for rendering the graphics scene, a graphics primitive, a vertex, a pixel fragment, or the like. The performance profiling application may also, in some instances, display a representation of selectable performance metrics, and receive a user selection of one of the selectable performance metrics as the specified performance metric. In such fashion, a user may specify the performance metric from a list of available, selectable metrics in order to view desired performance data for the rendered graphics elements.

In some examples, the performance analysis application may determine a range of values of the performance metric based upon the computed values of the performance metric for the graphics elements. The performance profiling application may then assign the graphical identifiers (e.g., colors, shading identifiers, cross-hatching identifiers) to the graphics elements based upon positions of the computed values of the performance metric for the graphics elements within the range of values.

As noted above, the graphical identifiers assigned to the graphics elements may comprise colors. In these cases, the performance analysis application may display the individual graphics elements according to colors that are assigned to the graphics elements, where one of the colors is assigned to each of the graphics elements. For example, upon processing of the graphics elements, the performance analysis application may assign a first color to a first rendered element (e.g., per draw command, per graphics primitive, per vertex, per pixel fragment) upon display, a second (different) color to a second rendered element upon display, and so on. In such fashion, the performance analysis application may display, on a per-element basis, performance information in an easy-to-understand format. An application developer may quickly view such information to identify performance characteristics of the graphics elements for rendering the scene, which may help the developer with application development, debugging, optimization, and/or other functions during application development.

The graphical identifiers assigned to the graphics elements may comprise other forms of identifiers, rather than colors. For example, shading and/or cross-hatching patterns, or identifiers, may be used. In some examples, the performance analysis application may display the individual graphics elements according to shading/cross-hatching identifiers that are assigned to the graphics elements, where one of the identifiers is assigned to each of the graphics elements. For example, upon processing of the graphics elements, the performance analysis application may assign a first cross-hatching pattern or identifier to a first rendered element (e.g., per draw command, per graphics primitive, per vertex, per pixel fragment) upon display, a second (different) cross-hatching pattern or identifier to a second rendered element upon display, and so on.

In some cases, the acts shown in FIG. 6 may be implemented by a single device, such as graphics device 50 shown in FIG. 2. In some cases, the acts of FIG. 6 may be implemented by one or more physically distinct devices, such as graphics device 2 and/or application computing device 20 shown in FIG. 1.

As shown in the example of FIG. 2, in some alternate examples, the performance analysis application may be executed or implemented directly within the graphics device (e.g., within graphics device 50). In these particular examples, receiving the performance information may include receiving values of one or more counters that are collected and provided by the graphics processing unit for each of the graphics elements, where the graphics elements comprise pixel fragments. Assigning the graphical identifiers to the graphics elements may include determining the graphical identifiers by using blending (e.g., blending hardware within the graphics processing system) to combine multiple ones of the pixel fragments based upon the values of the one or more counters.

Further, for the example device shown in FIG. 2, the method of FIG. 6 may include further acts that are performed by graphics device 50 (e.g., by a graphics driver of the device, such as graphics driver 18A shown in FIGS. 3 and 5). As will be described in further detail with reference to FIG. 8, for example, a graphics processing unit may determine at least a first value of at least one counter (e.g., counter for number of culled/clipped primitives) of the graphics processing unit prior to processing at least one of the graphics elements by the graphics processing unit.

The graphics processing unit may then determine at least a second value of the at least one counter of the graphics processing unit subsequent to processing of the at least one graphics element by the graphics processing unit. The graphics processing unit may determine the performance information for the at least one graphics element based upon a difference between at least the first and second values of the at least one counter of the graphics processing unit. In such fashion, the performance information comprises deltas in the counter values that are based upon the actual processing of the graphics elements, thereby providing performance-related information for the processing of these elements.

Figure 7:
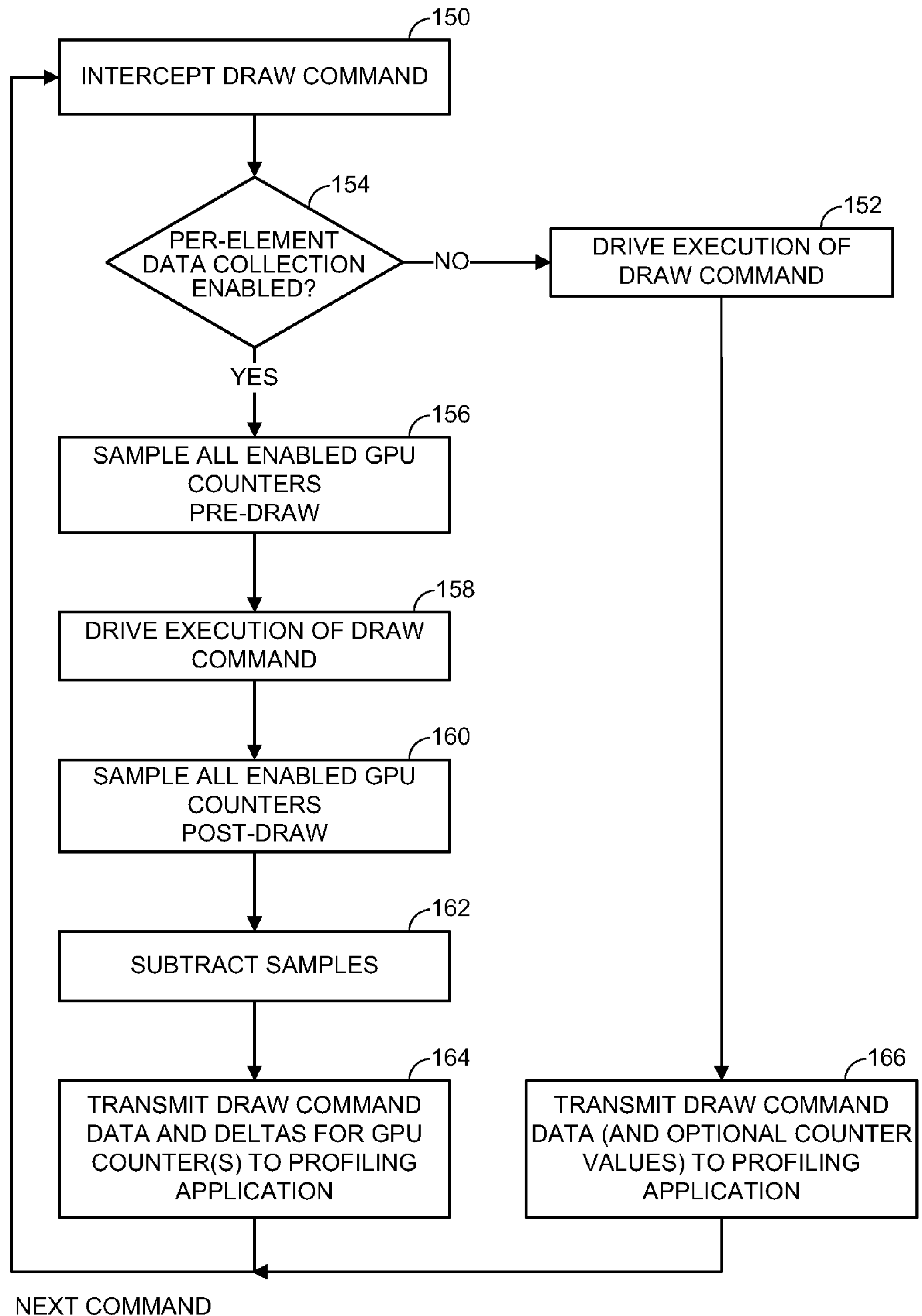
FIG. 7 is a flow diagram of an example method that may be performed by a graphics driver, such as the graphics driver shown in FIGS. 3 and 5.

FIG. 7 is a flow diagram of an example method that may be performed by a graphics driver, such as graphics driver 18A shown in FIGS. 3 and 5 or one of graphics drivers 68 shown in FIG. 2. In this example, it is assumed, for purposes of illustration only, that the graphics elements comprise individual draw commands. However, in other examples, the graphics elements may comprise other elements, such as graphics primitives, vertices, or pixel fragments.

Initially, the graphics driver may intercept a particular draw command (150), which may be included within a set of instructions (e.g., instructions 21 of FIG. 1, instructions 66 of FIG. 2). The graphics driver may intercept the command prior to its execution by the graphics processing unit.

After intercepting the command, the graphics driver may check to see if any per-element (e.g., per draw command, per graphics primitive, per vertex, per pixel fragment) performance data collection has been enabled (154) by the performance analysis application (e.g., performance analysis application 28 of FIG. 1, performance analysis application 70 of FIG. 2). Thus, the performance analysis application has the ability to dynamically enable or disable such data collection, on a per-command basis, by the graphics driver, given that each draw command may render a particular element.

The performance analysis application may disable data collection functionality in certain cases when per-element performance information is not needed or desired. In these cases (i.e., NO branch of 154), the graphics driver may drive the execution of the draw command by the graphics processing unit (152), and then transmit command data for the draw command to the performance analysis application (166). The performance analysis application may then emulate, or simulate, execution of the command, but may not display per-element performance metrics, given that such data collection by the graphics driver is not enabled. In some optional cases, the graphics driver may provide current counter values for the graphics processing unit to the analysis application, but such values may comprise current, total values of the corresponding counters, rather than values that are associated with individual draw commands that are executed to render individual graphics elements.

However, if such per-element data collection is enabled (i.e., YES branch of 154), the graphics driver may sample the current values of all enabled counters of the graphics processing unit (GPU) prior to execution of the draw commands (156). One or more of the counters may be enabled for data collection. In some cases, the graphics device may enable or disable the counters, while in some instances, the performance analysis application may enable or disable the counters based upon one or more selections of a user. For example, if an application developer is interested in viewing performance metrics information for one or more specified metrics at any point in time, the performance analysis application may provide a request to enable data collection from those counters of the graphics processing unit that are used in determining or calculating the specified, desired metrics. The analysis application, however, may disable data collection for any other counters, in an effort to mitigate or reduce processing overhead.

Next, the graphics driver drives execution of the draw command by the graphics processing unit (158), and then again samples the values of all enabled counters of the graphics processing unit (160). It is assumed, in the example of FIG. 7, that sampling GPU counters and executing draw commands are synchronous operations. In this example, the graphics driver may query one or more hardware registers, exposed by the graphics processing unit, which contain the counter values. Those values may then be immediately returned to the graphics driver.

In other examples, certain GPU architectures may permit the graphics driver to make a "pipelined" request to sample a GPU counter, and then the graphics driver may be subsequently notified or interrupted by the graphics processing unit when the sample is complete. In these instances, the actual collecting, or sampling, of counter data (156, 160) may be deferred until some time after the draw command executes.

For each GPU counter that is enabled, the first sampled values are subtracted from the corresponding second sampled values of the enabled GPU counters (162). Thus, for each specific GPU counter that is enabled, the graphics driver computes a delta or difference value, which represents the work that is performed by the graphics processing unit, as relevant to the specific GPU counter, in order to execute the single draw command. Thus, if the value of a particular GPU counter is five prior to execution of the draw command, and the value changes to eight subsequent to execution of the draw command, the delta value of three for that counter is associated with the execution of that particular draw command.

The graphics driver may then transmit command data associated with the draw command to the performance analysis application, as well as the delta values for the enabled GPU counters (164), such that the analysis application may recreate the draw command in an emulation environment and display a graphical representation of calculated performance metrics for an individual element based upon execution of the draw command. The command data may include function call parameters, render state, geometrical data, textures, shaders, and the like.

Figure 12:
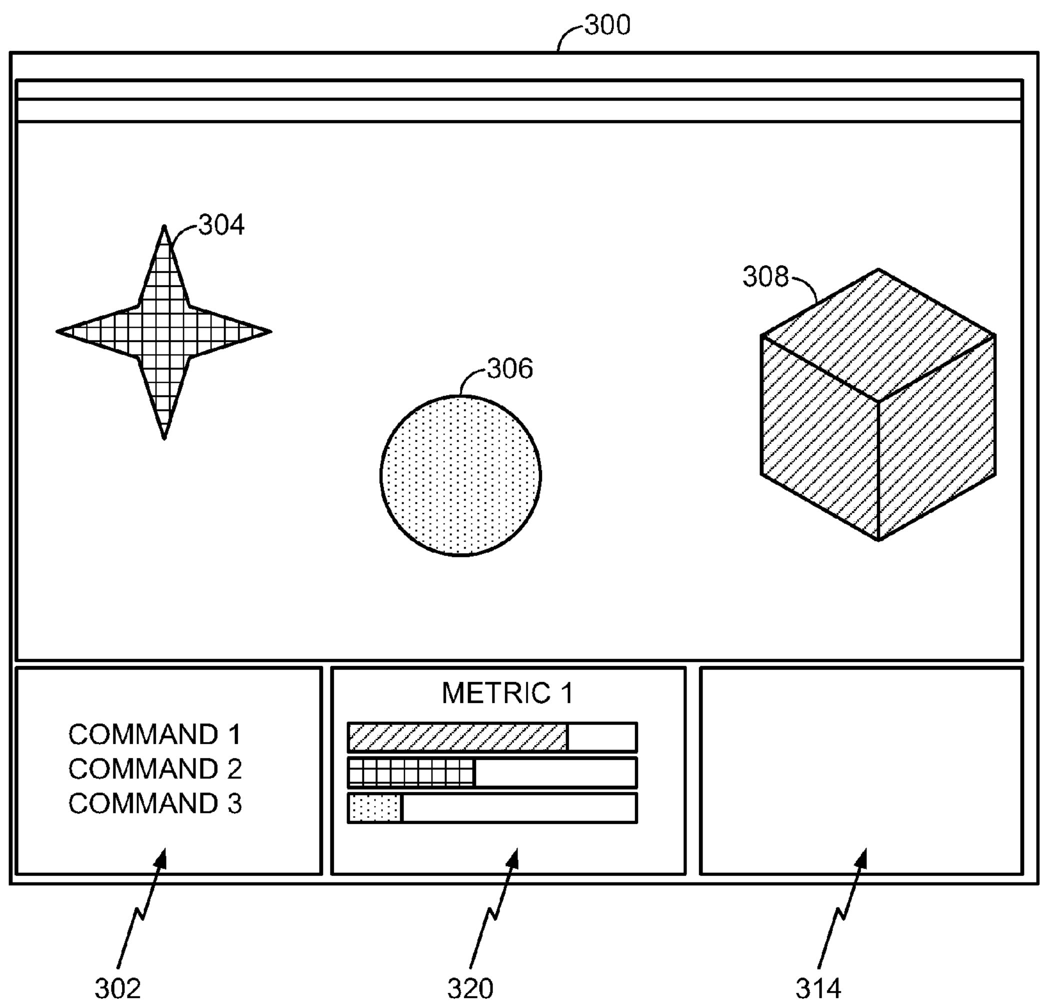
FIG. 12 is an example screen diagram illustrating the same graphical scene as FIG. 11, but with the individually rendered elements displayed according to assigned graphical identifiers (e.g., colors, shading and/or cross-hatching identifiers).

After transmitting data to the performance analysis application, the graphics driver may then repeat the various acts shown in FIG. 7 for one or more further draw commands. In so doing, the graphics driver is capable of providing state and performance information, along with the draw commands, to the performance analysis application, such that the analysis application can recreate the draw commands and display graphical representations of calculated metrics, on a per-element basis. FIG. 12 shows one example of such graphical representations.

In the example of FIG. 7, it has been assumed, for purposes of illustration only, that the graphics elements comprise individual draw commands. However, in other examples, the graphics elements may comprise other elements, such as graphics primitives, vertices, or pixel fragments. In these examples, the graphics driver is capable of collecting GPU counter data, including delta/difference data, based upon the processing of these graphics elements. For instance, at 150, rather than intercepting a draw command, the graphics driver may intercept a pixel fragment. At 156, the graphics driver may sample all enabled GPU counters prior to processing of the pixel fragment, and at 160, the graphics driver may sample all enabled GPU counters subsequent to processing the pixel fragment. The graphics driver is then capable of transmitting GPU counter data, as performance information on a per pixel-fragment basis, to the performance analysis application.

Figure 8:
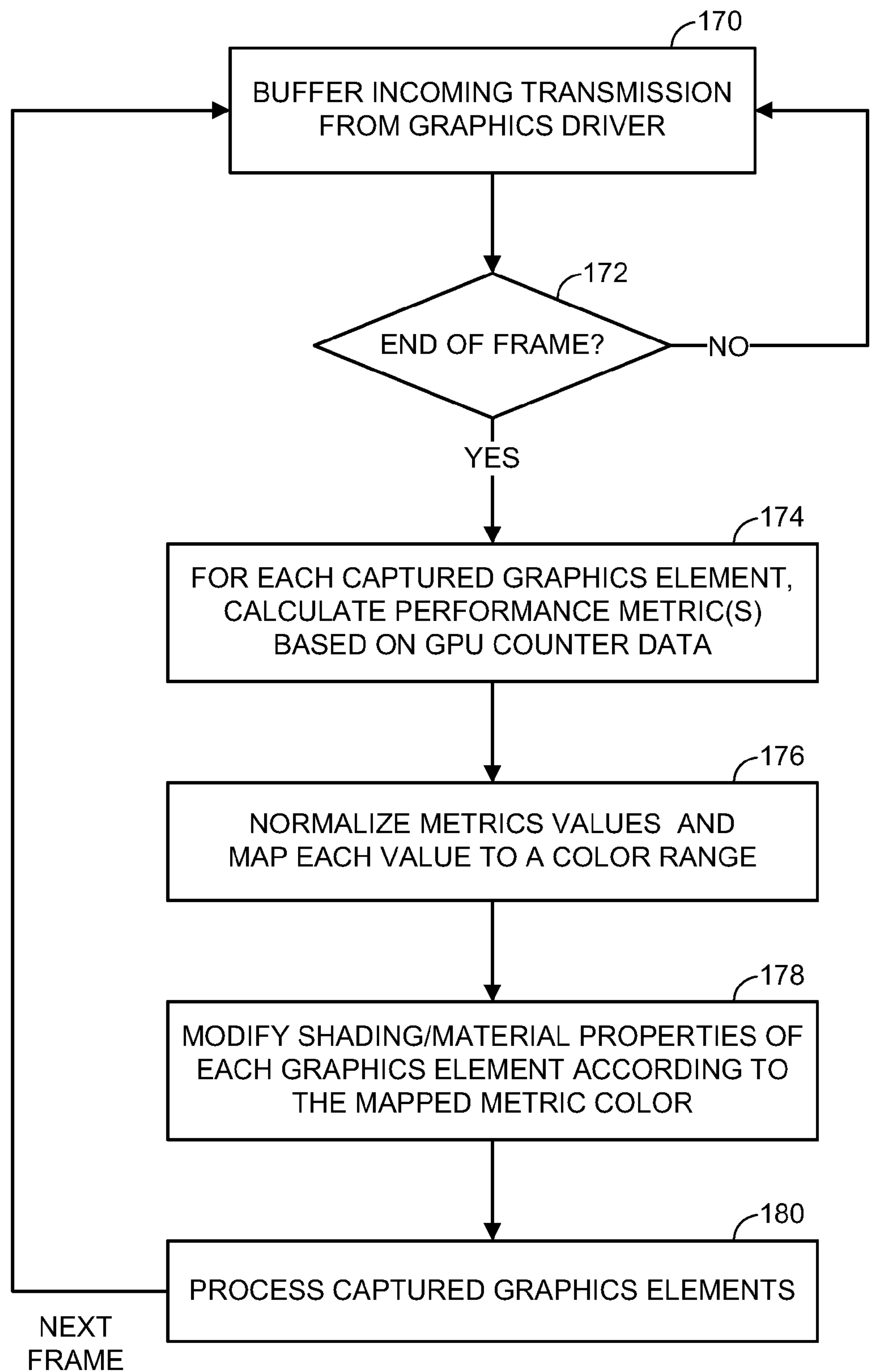
FIG. 8 is a flow diagram of an example method that may be performed by a performance analysis application, such as the performance analysis application shown in FIG. 1 or FIG. 2.

FIG. 8 is a flow diagram of an example method that may be performed by a performance analysis application, such as performance analysis application 28 of FIG. 1 or performance analysis application 70 of FIG. 2. The performance analysis application may receive the data provided by a graphics driver, such as the data that is transmitted as shown in FIG. 7. The performance analysis application may buffer such incoming transmission data upon receipt from the graphics driver (170). The incoming data may comprise data for graphics elements (e.g., draw commands, draw command data, primitive data, vertex data, pixel fragment data) and GPU counter data, and state/performance information (e.g., state/performance information 32). As described previously with respect to FIG. 7, the GPU counter data may comprise delta values, for any given GPU counter, that are associated with individual processing of graphics elements, on a per-element basis.

The performance analysis application may then check to see if it has received a full frame of animation from the graphics driver, i.e., whether an end of a frame has been reached (172). If not (i.e., NO branch of 172), the analysis application will continue to buffer incoming data until it has reached the end of a particular frame. If it has reached the end of the frame (i.e., YES branch of 172), then, for each received graphics element and associated GPU counter data, the performance analysis application computes values for one or more specified performance metrics using the received GPU counter values (174).

The performance analysis application may then normalize the calculated values associated with the commands for each performance metric, and then map each value to a graphical identifier within a set of identifiers (e.g., to a color within a color range, to a shading/cross-hatching identifier within a range or group of identifiers) (176). For example, the performance analysis application may calculate the minimum and maximum values of each specified performance metric across all graphics elements, forming a range for each performance metric (e.g., pixels written per clock cycle, shader instructions issued per vertex, memory writes executed per second, to name only a few examples) within the captured frame. For each performance metric, the numerical range may then be mapped to a spectrum or group of graphical identifiers (e.g., colors, delimiters, shades, cross-hatching, or other material properties). The performance analysis application then assign a graphical identifier to each graphics element using the position of the calculated value of the corresponding command within the range of values for that metric.

For example, the performance analysis application may receive GPU counter data for three different graphics elements from a graphics driver. The performance analysis application may calculate values of a particular metric for each of the three elements. The first graphics element may have a calculated metric value of three based upon the GPU counter data for this element, for instance; the second graphics element may have a calculated metric value of five; and the third graphics elements may have a calculated metric value of seven. Thus, the range of values for this metric may span from three to seven. It may be that, for this particular metric, a higher value indicates one or more potential performance issues (e.g., a higher number of memory writes).

In this particular example, the performance analysis application may create a spectrum or range of graphical identifiers for these values. For instance, a color yellow may be associated with a metric value of three; a color blue may be associated with a metric value of five; and a color red may be associated with a metric value of seven. Based upon these color designations, the performance analysis application may then assign the color yellow to the first graphics element, assign the color blue to the second graphics element, and assign the color red to the third graphics element.

As shown in FIG. 8, the performance analysis application may modify the shading or other material properties of each graphics element to visually represent (e.g., color or tint, shading/cross-hatching) any elements that are to be rendered based upon the graphical identifiers that are assigned to these elements (178), and may then process the graphics elements using a device emulator (180). In such fashion, the captured frame is recreated and displayed in a device emulator coupled for the analysis application by processing each captured graphics element (e.g., executing each draw command, processing each primitive/vertex/pixel fragment), where the individual elements (e.g., per draw command, per graphics primitive, per vertex, per pixel fragment) are appropriately identified (e.g., colored) according to the corresponding values of the computed performance metrics.

Thus, continuing with the above example, the performance analysis application may process the first graphics element, and visually display the rendering of this element using the color yellow. The analysis application may process the second graphics element, and visually display the rendering of this element using the color blue. Finally, the analysis application may process the third graphics element, and visually display the rendering of this element using the color red.

In this example, it may be that, for the particular metric, a higher value indicates one or more potential performance issues (e.g., a higher number of memory writes). Because higher metric values were associated with the color red, an application developer is capable of quickly viewing the visual representation of the elements that were rendered upon processing of the first, second, and third graphics elements. Those rendered elements that are colored red may have potential performance implications. The developer can then select these elements or otherwise identify the red graphics elements (e.g., within a command window, as shown in FIGS. 9-12), and may then assess whether any optimizations to the command or to the program in general can be made. As noted above, various other forms of graphical identifiers, other than colors, may be used in different examples.

In such fashion, the developer is able to quickly view a graphical display of rendered elements, in an emulation environment, and identify particular elements that may have performance implications based upon the way in which they are displayed. The developer may, in some cases, identify corresponding draw commands that cause these elements to be rendered, and make tune or otherwise modify the application for optimization.

Upon processing of the graphics elements, the performance analysis application may repeat 170, 172, 174, 176, 178, and 180 for multiple different frames. In the above example, the performance analysis application utilized different colors to differentiate rendered elements. In other cases, various other forms of graphical identifiers may be used in lieu of, or combination with, colors. For instance, the performance analysis application may assign shading or cross-hatching properties, or identifiers, to different graphics elements based upon the calculated values of a particular metric for these elements. In general, the performance analysis application may assign graphical identifiers to the various different graphics elements that are processed.

Figure 9:
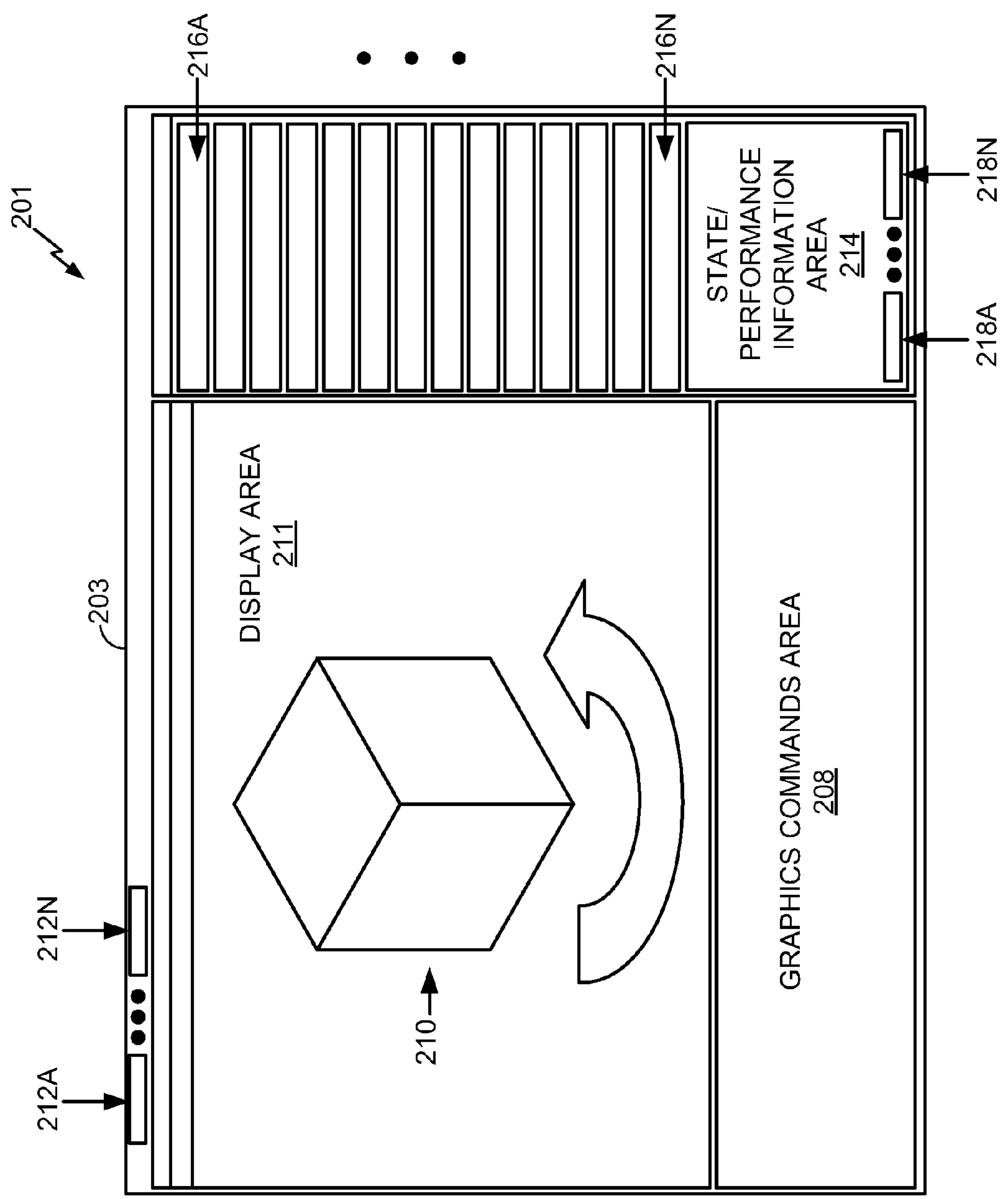
FIG. 9 is a conceptual diagram illustrating an example of information that may be displayed by a performance analysis application, such as the performance analysis application shown in FIG. 1 or FIG. 2.

FIG. 9 is a conceptual diagram illustrating an example of information that may be displayed on a display device 201 by a performance analysis application, such as the performance analysis application shown in FIG. 1 or FIG. 2. Display device 201 is capable of displaying, within window 203, a 2D or 3D graphics image 210 based upon graphics commands and state/performance information that are sent from a graphics device, such as one of the graphics devices shown in FIG. 1 or FIG. 2. The graphics image 210 may comprise one or more elements that have been rendered during execution of the graphics commands, including draw commands.

Display device 201 may also be capable of displaying visual representations of the instructions and state/performance information, such that a developer may change these instructions and information to modify graphics image 210 or an entire scene that includes graphics image 210. As shown in the example of FIG. 9, display device 201 may display various types of information within a graphical user interface. In this example, display device 201 displays graphical window 203 within the graphical user interface. Window 203 includes a display area 211, a graphics commands area 208, and a state/performance information area 214. Display area 211 includes graphics image 210. In this example, graphics image 210 comprises a cube.

In the example of FIG. 9, graphics commands area 208 includes a visual representation of one or more graphics commands, including draw commands, which have been received by the analysis application and that are currently being, or have been, executed. The visual representation of such commands may comprise a representation of such commands. For example, when the analysis application receives binary graphics commands, display device 201 may display a representation of such binary instructions in another form, such as higher-level application programming interface (API) instructions (e.g., OpenGL instructions). Mapping information, such as mapping information stored locally with performance analysis application or provided by the graphics device, may be used to map received binary commands into another format that may be displayed within graphics commands area 208.

State/performance information area 214 includes a visual representation of selected state and/or performance information that has been received by the performance analysis application. The received graphics commands and state/performance information may be used to display graphics image 210 within display area.

Window 203 also includes one or more selectors 212A-212N. A user, such as an application developer, may select any of these selectors 212A-212N. Each selector 212A-212N may be associated with different functions, such as statistical and navigation functions, as will be described in more detail below. Window 203 further includes selectors 216A-216N and 218A-218N, each of which may be selected by a user. Each selector 216A-216N and 218A-218N may also be associated with different functions, such as metric functions, override functions, and/or texture functions, as will be described in more detail below in reference to FIG. 10.

A user, such as an application developer, may change information displayed within window 203. For example, the user may modify one or more of the instructions displayed within graphics commands area 208, or any of the state/performance information within state/performance information area 214.

Any changes initiated by the user within window 203 may then be sent back to, or within, the graphics device as requested modifications (e.g. requested modifications 34 shown in FIG. 1). The graphics device may then process these modifications, and provide updated instructions and/or information which may then be displayed within graphics commands area 208 and/or state/performance information area 214. The updated instructions and/or information may also be used to display a modified version of graphics image 210 within display area 211.

In one example, the state and/or performance information that may be displayed within area 214 may be analyzed by the device that includes display device 201, which may be the graphics device (FIG. 2) or a separate application computing device (FIG. 1) to identify potential bottlenecks during execution of the graphics commands. Ultimately, a user, such as an application developer, may wish to view the information presented in window 203 during a debugging process to optimize the execution of the commands. Through analysis of state and/or performance information, potential bottlenecks and possible workarounds can be displayed in window 203, such as within one or more sub-windows or pop-up windows, or within area 214 of window 203.

In one example, window 203 may display a report on the bottlenecks encountered in the call-stream of the graphics instructions received from graphics device 200, and may also display possible workarounds. In some cases, these possible workarounds may be presented as "what-if" scenarios to the user. For example, rendering a non-optimized triangle-list in a call-stream may be presented as one possible scenario, while pre-processing that list through a triangle-strip optimization framework may be presented as a second possible scenario. The user may select any of these possible workaround scenarios as requested modifications, and the requested modifications are then transmitted back to the graphics device, where the performance produced by the modification may be measured.

The graphics device then sends updated commands/information, which may be presented within graphics commands area 208 and/or state/performance information area 214. The user can then view the results, and compare results for various potential workarounds to identify an optimum solution. The user can use this process to quickly identify a series of steps that can be taken in order to remove bottlenecks from their application.

The user may iteratively continue to make adjustments within window 203 for purposes of experimentation, or trial/error debugging. The user may experiment with various different forms or combinations of graphics commands and state/performance information to identify changes in the images or scenes that are displayed within display area 211. The user can use the simulation environment provided by the contents of window 203 to interactively view and modify the graphics commands, which may be part of a call-stream, and states provided by the graphics device without having to recompile source code and re-execute the compiled code on the graphics device.

In some cases, the user may manipulate one or more of buttons 212A-212N to manipulate a graphical navigation controller, such as graphical camera, to modify a perspective view of graphics image 210. Such manipulation may be captured as requested modifications that are then sent back to graphics device 200. The updated commands/information provided by the graphics device are then used to modify the perspective view of graphics image 210.

In some cases, various texture and/or state information may be provided in area 214 of window 203 as modifiable entities. In addition, a user may even select, for example, a pixel of graphics image 210 within display area 211, such that one or more corresponding instructions within graphics commands area 208 are identified. In this fashion, a user can effectively drill backwards to a rendering instruction or call that was used to render or create that pixel or other portions of graphics image 210. Because graphics device 201 may create image 210 in window 203 exactly as it is presented on graphics device 200, the user is able to quickly isolate issues in their application (which may be based on the various graphics instructions displayed in graphics commands area 208), and modify any states within state/performance area 214 to prototype new effects.

The information displayed within display area 211 may allow an application developer to measure and visualize a large set of properties of the processing of individual 2D or 3D elements by the graphics processing unit of the graphics device. The performance analysis application may enable the capture of one or more large sets of performance measurements per each individual rendered element (e.g., per draw command, per graphics primitive, per vertex, per pixel fragment) within image 210. Information gleaned from this may help the developer more effectively tune design or performance characteristics of the application in order to run more efficiently on a targeted hardware platform.

For example, as noted above, each element (e.g., per draw command, per graphics primitive, per vertex, per pixel fragment) of image 210 rendered within display area 211 may be assigned a graphical identifier based upon computed metric values of a specified performance metric for the draw commands that are executed to render the elements. The computed metric values are based upon the performance information that is received by the performance analysis application. Because each element of image 210 is displayed according to its assigned graphical identifier (e.g., color, shading, cross-hatching), as described previously and further described with reference to FIG. 12, the developer is able to quickly identify the performance issues or impacts of rendering the elements according to the particular draw commands that have been provided in a given application.

Figure 10:
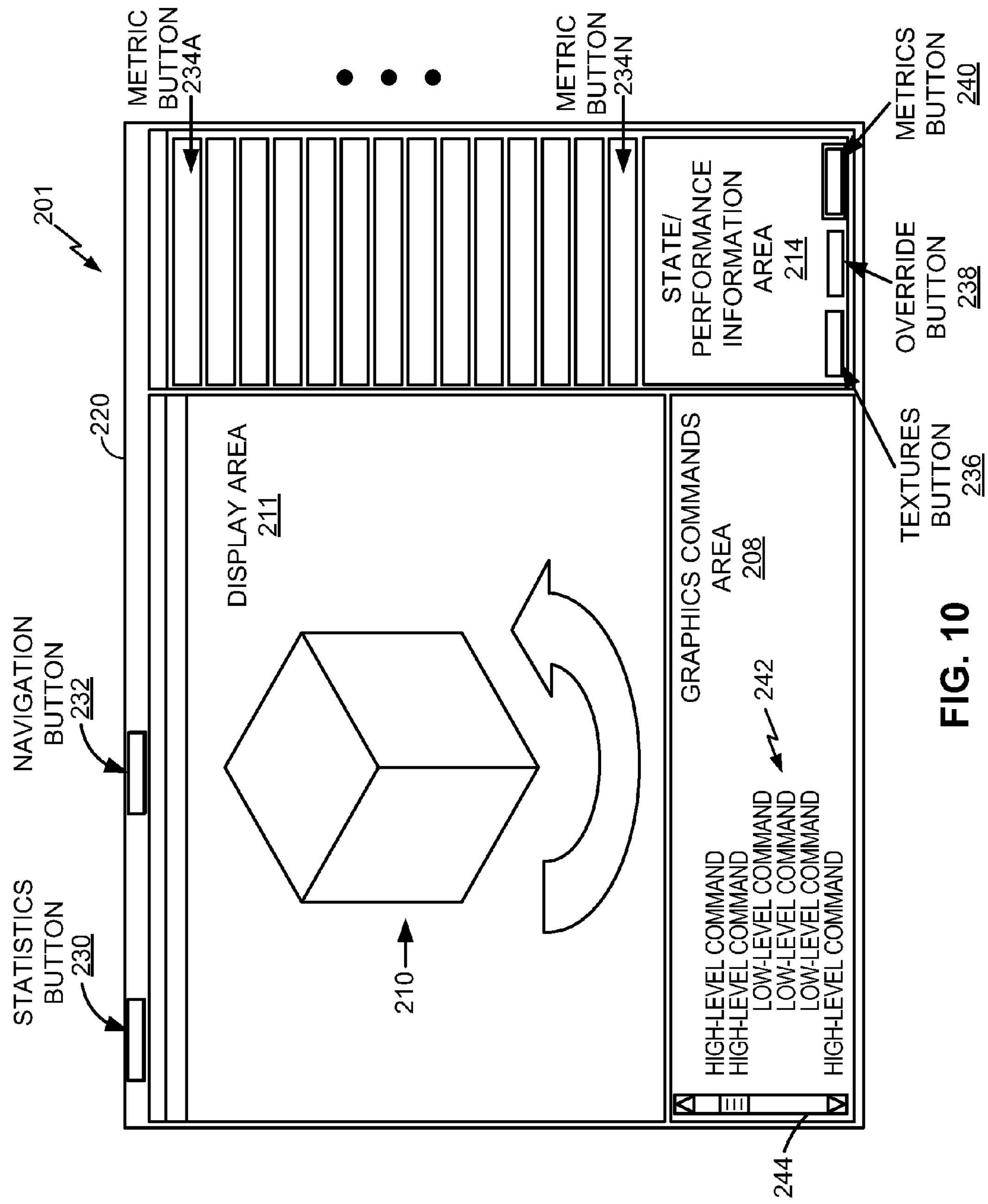
FIG. 10 is a conceptual diagram illustrating another example of information that may be displayed by a performance analysis application, such as the performance analysis application shown in FIG. 1 or FIG. 2.

FIG. 10 is a conceptual diagram illustrating another example of information that may be displayed by a performance analysis application, such as the performance analysis application shown in FIG. 1 or FIG. 2. In this example, window 220 displayed within a graphics device includes various instruction information as well as metric information.

For example, within graphics commands area 208, various graphics commands 242 are shown. Graphics commands 242 may be a subset of graphics commands that are provided by a graphics device.

As is shown in the example of FIG. 10, graphics commands 242 include both high-level instructions and low-level instructions. A user, such as an application developer, may use scrollbar 244 to view the full-set of instructions 242. Certain high-level instructions may include one or more low-level instructions, such as lower-level API instructions. The application developer may, in some cases, select (e.g., such as by clicking) on a particular high-level instruction in order to view any low-level instructions that are part of, or executed by, the associated high-level instruction.

In some examples, a developer is capable of viewing the commands within area 208 that are executed to render the graphics elements of image 210. In some cases, if particular elements of image 210 are shown with graphical identifiers or properties (e.g., colors based upon computed performance metric values), a user may be able to select such elements and determine, from the display within graphics commands area 208, which command(s) have been executed to render the selected elements. In some cases, the commands themselves, within area 208, may be associated with the same graphical identifiers as the rendered elements of image 210, such that a user can associate particular commands with rendered elements. In such fashion, the user is able to have a better understanding of which commands are associated with which rendered elements in image 210.

Various selection buttons are shown below state/performance information area 214 in FIG. 10. These selection buttons include a textures button 236, an override button 238, and a metrics button 240. In the example of FIG. 10, the application developer has selected the metrics button 240. Upon selection of this button, various metrics options may be displayed. For example, one or more metric buttons 234A-234N may be displayed above state/performance area 214. Each metric button 234A-234N may be associated with a particular metric. In some cases, one or more of these metrics may be predefined or preconfigured metric types and, in some cases, the application developer may select or customize one or more of the metrics. Example metrics may include, for example, any one or more of the following: frames per second, % busy (for one or more processors), bus busy, memory busy, vertex busy, vertices per second, triangles per second, pixel clocks per second, fragments per second, shader instructions issued per vertex, etc. The application developer may select any of metric buttons 234A-234N to view additional details regarding the selected metrics.

By selecting one of metric buttons 234A-234N, the developer is able to select or specify a particular performance metric for which to compute metric values for particular commands. For example, upon receipt of a group of draw commands and performance information from a graphics device that includes a graphics processing unit, a performance analysis application, such that the ones shown in FIGS. 1 and 2, is capable of calculating metric values of a specified metric for the commands based upon the receiving performance information (e.g., counters for a graphics processing unit). The specified metric may be based upon a selection of one of metric buttons 234A-234N.

For example, if metric button 234A is associated with the number of frames per second, the application developer may select metric button 234A to view additional details on the number of frames per second, related to performance, for graphics image 210, or select portions of graphics image 210. The developer may, in some cases, select metric button 234A, or drag metric button 234A into state/performance information area 214. The detailed information on the number of frames per second may be displayed within state/performance information area 214. The developer also may drag metric button 234A into display area 211, or select a portion of graphics image 210 for application of metric button 234A. For example, the developer may select a portion of graphics image 210 after selecting metric button 234A, and then detailed information on the number of frames per second for that selected portion may be displayed within state/performance information area 214. In such fashion, the developer may view performance data for any number of different metric types based upon selection of one or more of metric buttons 234A-234N, and even possible selection of graphics image 210 or a portion thereof.

In one example, metric data that may be displayed within window 220 may be provided by a graphics driver (e.g., graphics driver 18A shown in FIG. 5) of a graphics device. This graphics driver may implement a hardware counter module (e.g., hardware counter module 114 of FIG. 5) and/or a processor usage module (e.g., processor usage module 112 of FIG. 5) to provide various data that may then be displayed as metric data within window 220.

The developer may, in some cases, also select textures button 236. Upon selection, various forms of texture information related to graphics image 210 may be displayed by the graphics device. For example, texture information may be displayed within window 220, such as within state/performance information area 214. In some cases, the texture information may be displayed within an additional (e.g., pop-up) window (not shown). The developer may view the displayed texture information, but may also, in some cases, modify the texture information. In these cases, any modifications to the texture information may be propagated back to the graphics device as requested modifications. Upon receipt of updated commands/information from the graphics device, changes to graphics images 210 may be displayed within display area 211.

The developer may, in some cases, also select override button 238. After selection of override button 238, certain information, such as instruction and/or state information, may be displayed (e.g., within window 220 or another window) which may be modified, or overridden, by the developer. Any modifications or overrides may be included within one or more requested modifications that are sent to the graphics device. In one example, the graphics device may implement a graphics driver, such as graphics driver 18A (FIG. 5), to process any requested modifications. For example, the graphics device may use override module 120 to process such requested modifications that comprise one or more overrides.

In some cases, the developer may override one or more over graphics commands 242 that are shown within graphics commands area 208. In these cases, the developer may type or otherwise enter information within graphics commands area 208 to modify or override one or more of graphics commands 242. These modifications may then be sent to the graphics device, which will provide updated commands/information to update the display of graphics image 210 within display area 211. The developer may change, for example, parameters, ordering, type, etc., of graphics commands 242 to override one or more functions that are provided by instructions 242.

Window 220 further includes selection buttons 230 and 232. Selection button 230 is a statistics button, and selection button 232 is a navigation button. The developer may select statistics button 230 to view statistical information associated with the display of graphics image 210. This statistical information may comprise one or more graphs, tables, or other forms of statistical information. The developer may view statistical information to obtain a better understanding of various performance or other related issues associated with the display of graphics image 210.

The developer may select navigation button 232 to navigate within display area 211, and even possibly to change a perspective view of graphics image 210 within display area 211. For example, upon selection of navigation button 232, a 3D graphical camera or navigation controller may be displayed. The developer may interact with the controller to navigate to any area within display area 211. The developer may also use the controller to change a perspective view of graphics image 210, such as by rotating graphics image 210 or zooming in/out.

In one example, any developer-initiated changes through selection of navigation button 232 and interaction with a graphical navigation controller may be propagated back to the graphics device as requested modifications (e.g., part of requested modifications 84 shown in FIG. 1). Updated commands/information then provided by the graphics device may then be used to update the display (e.g., perspective view) of graphics image 210. In addition, updated instructions may be displayed within graphics commands area 208. Updated state/performance information may also be displayed within state/performance information area 214.

As a result, the developer may effectively and efficiently determine how alternate perspectives, orientations, views, etc., for rendering and displaying graphics image 210 may affect performance and state of the graphics device. This may be very useful to the developer in optimizing the graphics commands 242 that are used to create and render graphics image 210 in the simulation environment displayed on display device 201, and effectively of the graphics image that is displayed on the graphics device.

Figure 11:
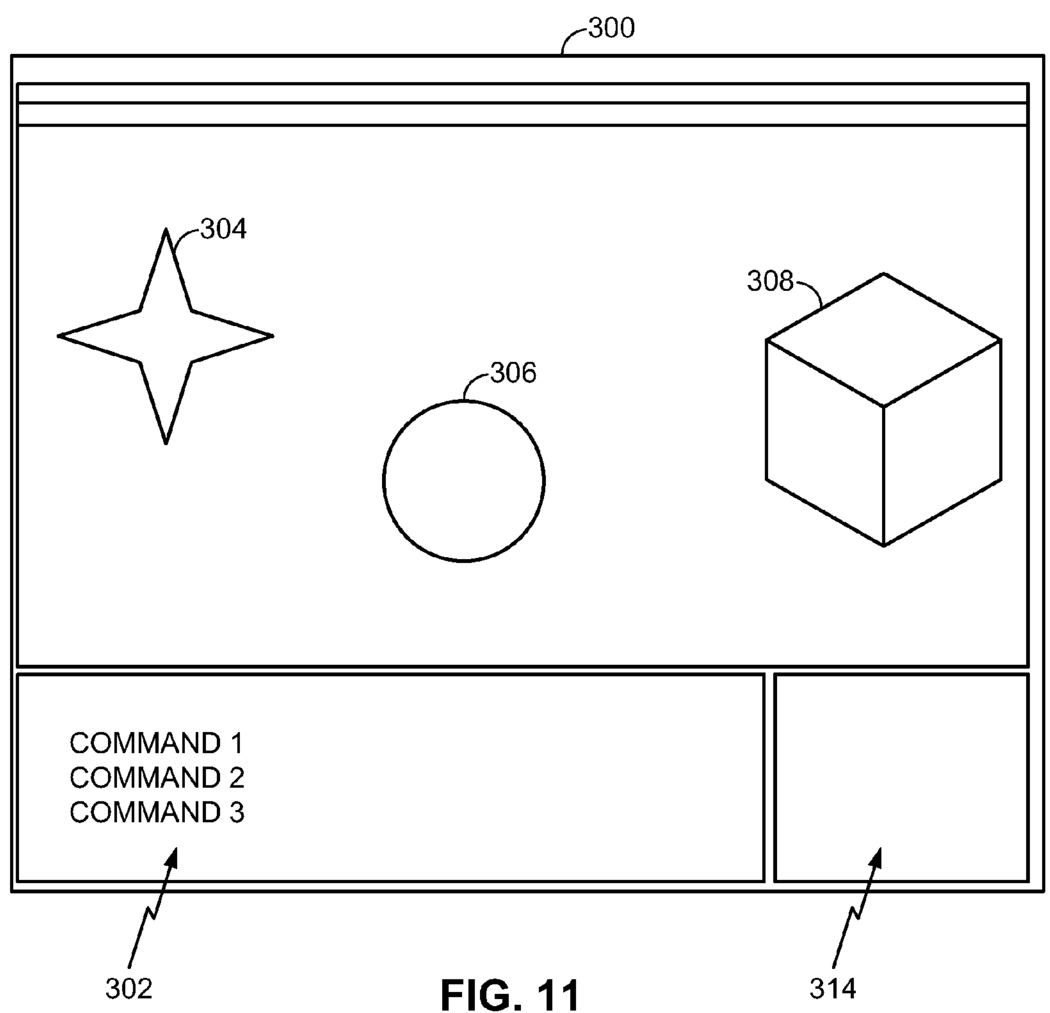
FIG. 11 is an example screen diagram illustrating a graphical scene that includes a number of individually rendered elements.

FIG. 11 is an example screen diagram illustrating a graphical scene that includes a number of individually rendered elements 304 (e.g., star), 306 (e.g., circle), 308 (e.g., cube). In general, graphics elements may comprise one or more draw commands, primitives, vertices, pixels/pixel fragments, or the like. The example graphic scene shows, for example, a frame of animation that may captured from an application, such as a video game application. The graphics scene is shown inside window 300, which may, in some cases, be included within window 203 (FIG. 9) or window 220 (FIG. 10). Thus, in these cases, the graphics scene may be rendered during the processing of graphics elements (e.g., draw commands) by a performance analysis application, such as the performance analysis application shown in FIG. 1 or FIG. 2.

However, in the diagram of FIG. 11, the performance analysis application has not rendered the graphics elements 304, 306, 308 using graphical identifiers that represent performance metrics values associated with the graphics elements. In this example, per-element data collection may not be enabled (see, e.g., NO branch of 154 in FIG. 7), such that the rendered elements are displayed without any extra graphical identifiers or characteristics (e.g., colors, cross-hatching, shading), given that per-element performance metrics are not calculated by the performance analysis application.

Window 300 displays the graphics elements 304, 306, 308 within a display area (e.g., display area 211 of FIGS. 9 and 10). Graphics element 304 is a star within the scene; graphics element 306 is a circle within the scene; graphics element 308 is a cube.

Window 300 further includes a graphics commands area 302 (e.g., graphics command area 208 of FIGS. 9 and 10). In the example of FIG. 11, various different high-level commands and/or low-level commands (e.g., "Command 1", "Command 2", "Command 3), such as those shown within area 208 of FIG. 10, may be displayed. In some cases, a list of OpenGL ES API calls executed by an application to draw the graphics elements in the scene may be shown in graphics commands area 302. These OpenGL ES API calls may comprise draw calls that, when executed by the performance analysis application, render the various graphics elements of the scene that is shown. In one particular example, each draw call may comprise a "glDrawElements" call, where each call to "glDrawElements" corresponds to an individual rendered object in the scene.

Rendered elements may comprise objects, such as the various objects shown in FIG. 11, or any portions thereof (e.g., primitives, vertices, pixel fragments, combinations thereof). In some cases, rendered elements may comprise individual primitives/vertices/pixels/fragments/etc. that are displayed within a graphics scene. In these cases, a particular draw command, upon execution, may render one or more of these primitives/vertices/pixels/fragments/etc.

FIG. 11 also shows an area 314 that is capable of displaying state information (e.g., state calls). Various different OpenGL state calls may be shown in this area. One or more of these state calls may be invoked by performance analysis application prior to the invocation of any particular draw command shown in area 302. The state calls may be invoked to set up various state parameters that may be needed for execution of one or more of the draw commands.

FIG. 12 is an example screen diagram illustrating the same graphical scene as FIG. 11, but with the individually rendered elements displayed according to assigned graphical identifiers (e.g., colors, shading, cross-hatching). In this particular example, per-element rendering and data collection has been enabled (e.g., YES branch of 154 in FIG. 7). FIG. 12 shows the same scene as in FIG. 11, except that the scene of FIG. 11 is now graphically presented according to the captured performance data.

Performance analysis application has collected performance data from a graphics processing unit for each of the draw commands shown in area 302, and has computed values of a specified performance metric based upon the collected performance data. Performance analysis application has also assigned a graphical identifier (e.g., color, shading identifier, cross-hatching identifier) to each of the graphics elements based upon the corresponding computed value of the specified performance metric, and displayed individual graphics elements 304, 306, 308 that are rendered according to the graphical identifiers that are assigned to the graphics elements. In general, graphics elements may comprise one or more draw commands, primitives, vertices, pixels/pixel fragments, or the like, that are processed or execution during rendering of the displayed scene. Performance analysis application may compute such metric values of each command for a number of different performance metrics.

In the example of FIG. 12, an example performance metric of "Metric 1" is shown in metrics area 320. "Metric 1," for example, may comprise a performance metric for fragments shaded or clocks. "Metric 1" is the currently specified performance metric for which metric values of the graphics elements are computed for displaying the rendered elements with the particular graphical identifiers.

If the graphical identifiers comprise cross-hatching identifiers, as shown in the example of FIG. 12, the performance analysis application may render certain elements using one cross-hatching identifier (e.g., pattern) if such elements have higher metric values for the specified performance metric, meaning they may be more computationally expensive (e.g., require more processing, higher bandwidth) to draw. The performance analysis application may render other elements using another cross-hatching identifier (e.g., pattern) if the elements have lower metric values, meaning they may be computationally cheaper to draw.

If the graphical identifiers were, in another example, to comprise colors, rather than cross-hatching identifiers, the performance analysis application may color rendered elements in one color, such as red, if such elements have higher metric values for the specified performance metric, meaning they may be more computationally expensive (e.g., require more processing, higher bandwidth) to draw. The performance analysis application may color rendered elements in another color, such as green, if the elements have lower metric values, meaning they may be computationally cheaper to draw.

Visualizing the metrics data in this way may allow a game developer, for example, to take a quick survey of how a device is rendering a particular scene. In the scene of FIG. 12, element 306 may be the reddest in color, or have a particular cross-hatching pattern, meaning that it is taking the most clock cycles on the graphics processing unit to render.

Rendered elements may comprise objects, such as the various objects shown in FIG. 12. In some cases, rendered elements may comprise individual primitives, vertices, pixels/pixel fragments, and the like, that are displayed within a graphics scene. In such cases, the elements within the graphics scene, rather than the larger objects, may be displayed using the graphical identifiers (e.g., colors, shading, cross-hatching identifiers) that are associated with certain metric values based upon processing of the elements during rendering of the scene. Thus, the user is capable of viewing performance metric data on a per-element basis (e.g., per draw command, per graphics primitive, per vertex, per pixel fragment), and assessing which elements are more computationally expense to render.

Area 320 shows individual horizontal bar graphs associated with specific commands. Each bar graph comprises a representation of the computed metric value for the corresponding command. For instance, "Command 1" has a particular computed metric value for "Metric 1," and the corresponding bar graph in area 320 provides a graphical representation of this value. As shown, each of the draw commands "Command 1," "Command 2," and "Command 3" include bar graph representations for their corresponding metric values of the metric "Metric 1" (e.g., fragments shaded metric, clocks metric).

Each of the individual bar graphs may also be displayed according to the graphical identifiers that have been assigned to the corresponding commands by the performance analysis application. Thus, if graphics command "Command 1" has been assigned a particular cross-hatching identifier (e.g., pattern) for "Metric 1," indicating that the execution of this command may be computationally expensive for this metric, the corresponding bar graph for "Command 1" (e.g., located to the right of "Command 1") in area 320 may also be displayed or represented using the same cross-hatching identifier. In such fashion, the user is capable of associating particular commands with the corresponding metric values. Assuming that element 308 is also displayed or represented with the same cross-hatching identifier in this example, the user is able to determine which rendered element is rendered or otherwise associated with a particular command (e.g., "Command 1"), and then able to quickly identify those elements/commands that are computationally expensive based upon their associated identifiers. In some cases, the user may click or select the bar graphs to view numerical values of the calculated metrics.

In the example of FIG. 12, "Command 1" may be executed to render element 308, "Command 2" may be executed to render element 304, and "Command 3" may be executed to render element 306. As shown by the corresponding bar graphs in area 320 for "Metric 1", "Command 1" (for corresponding element 308) may be more computationally expensive to render than "Command 2" (for corresponding element 304), given the lengths of the corresponding bar graphs. "Command 2" (for corresponding element 304) may be more computationally expensive to render than "Command 3" (for corresponding element 306).

The techniques described in this disclosure may be implemented within a general purpose microprocessor, digital signal processor (DSP), application specific integrated circuit (ASIC), field programmable gate array (FPGA), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware and/or software. Accordingly, the representation of features as components, units or modules is intended to highlight particular functional features for ease of illustration, and does not necessarily require realization of such features by separate hardware or software components. In some cases, various units may be implemented as programmable processes performed by one or more processors.

Any features described herein as modules, devices, or components, including graphics device 100 and/or its constituent components, may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multimedia applications and devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media.

The techniques additionally, or alternatively, may be realized at least in part by a computer-readable communication medium that carries or communicates code in the form of instructions or data structures and that can be accessed, read, and/or executed by one or more processors. Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:

receiving performance information provided by a graphics processing unit, wherein the performance information has been measured by the graphics processing unit in association with individual graphics elements for rendering a graphics scene;

computing, by a computing device, values of a performance metric for the graphics elements based upon the performance information, wherein each computed value is associated with at least one of the graphics elements;

assigning graphical identifiers to the graphics elements based upon the computed values of the performance metric for the graphics elements, wherein one of the graphical identifiers is assigned to each of the graphics elements; and displaying the graphics elements, when rendering the graphics scene, according to the graphical identifiers that are assigned to the graphics elements.

2. The method of claim 1, wherein receiving the performance information comprises receiving values of one or more counters that are collected and provided by the graphics processing unit for each of the graphics elements.

3. The method of claim 1, wherein each of the graphics elements comprises one or more draw commands for rendering the graphics scene, a graphics primitive, a vertex, or a pixel fragment.

4. The method of claim 1, further comprising:

displaying a representation of selectable performance metrics; and receiving a user selection of one of the selectable performance metrics as the performance metric.

5. The method of claim 1, further comprising:

determining a range of values of the performance metric based upon the computed values of the performance metric for the graphics elements, wherein assigning the graphical identifiers to the graphics elements comprises assigning the graphical identifiers to the graphics elements based upon positions of the computed values of the performance metric for the graphics elements within the range of values.

6. The method of claim 1, wherein assigning graphical identifiers to the draw commands comprises assigning colors to the graphics elements based upon the computed values of the performance metric for the graphics elements, and wherein one of the colors is assigned to each of the graphics elements.

7. The method of claim 6, wherein displaying the graphics elements comprises displaying the individual graphics elements according to the colors that are assigned to the graphics elements.

8. The method of claim 1, wherein the graphics processing unit is included within the computing device.

9. The method of claim 8, wherein receiving the performance information comprises receiving values of one or more counters that are collected and provided by the graphics processing unit for each of the graphics elements, wherein the graphics elements comprise pixel fragments, and wherein assigning the graphical identifiers to the graphics elements comprises determining the graphical identifiers by using blending to combine multiple ones of the pixel fragments based upon the values of the one or more counters.

10. The method of claim 1, wherein the graphics processing unit is included within a mobile device that is physically distinct from the computing device.

11. The method of claim 1, further comprising:

determining at least a first value of at least one counter of the graphics processing unit prior to processing at least one of the graphics elements by the graphics processing unit;

determining at least a second value of the at least one counter of the graphics processing unit subsequent to processing of the at least one graphics element by the graphics processing unit; and determining the performance information for the at least one graphics element based upon a difference between at least the first and second values of the at least one counter of the graphics processing unit.

12. A device, comprising:

a display device; and one or more processors coupled to the display device, wherein the one or more processors are configured to:

receive performance information provided by a graphics processing unit, wherein the performance information has been measured by the graphics processing unit in association with individual graphics elements for rendering a graphics scene;

compute values of a performance metric for the graphics elements based upon the performance information, wherein each computed value is associated with at least one of the graphics elements;

assign graphical identifiers to the graphics elements based upon the computed values of the performance metric for the graphics elements, wherein one of the graphical identifiers is assigned to each of the graphics elements; and display the graphics elements, when rendering the graphics scene on the display device, according to the graphical identifiers that are assigned to the graphics elements.

13. The device of claim 12, wherein the one or more processors are configured to receive the performance information at least by receiving values of one or more counters that are collected and provided by the graphics processing unit for each of the graphics elements.

14. The device of claim 12, wherein each of the graphics elements comprises one or more draw commands for rendering the graphics scene, a graphics primitive, a vertex, or a pixel fragment.

15. The device of claim 12, wherein the one or more processors are further configured to:

display, on the display device, a representation of selectable performance metrics; and receive a user selection of one of the selectable performance metrics as the performance metric.

16. The device of claim 12, wherein the one or more processors are further configured to determine a range of values of the performance metric based upon the computed values of the performance metric for the graphics elements, wherein assigning the graphical identifiers to the graphics elements comprises assigning the graphical identifiers to the graphics elements based upon positions of the computed values of the performance metric for the graphics elements within the range of values.

17. The device of claim 12, wherein the one or more processors are configured to assign graphical identifiers to the draw commands at least by assigning colors to the graphics elements based upon the computed values of the performance metric for the graphics elements, and wherein one of the colors is assigned to each of the graphics elements.

18. The device of claim 17, wherein the one or more processors are configured to display the graphics elements at least by displaying the individual graphics elements according to the colors that are assigned to the graphics elements.

19. The device of claim 12, wherein the graphics processing unit is included within the device.

20. The device of claim 19, wherein the performance information comprises values of one or more counters that are collected and provided by the graphics processing unit for each of the graphics elements, wherein the graphics elements comprise pixel fragments, and wherein the one or more processors are configured to assign the graphical identifiers to the graphics elements at least by determining the graphical identifiers by using blending hardware in the device to combine multiple ones of the pixel fragments based upon the values of the one or more counters.

21. The device of claim 12, wherein the graphics processing unit is included within another, physically distinct device.

22. The device of claim 12, wherein the one or more processors are further configured to:

determine at least a first value of at least one counter of the graphics processing unit prior to processing at least one of the graphics elements by the graphics processing unit;

determine at least a second value of the at least one counter of the graphics processing unit subsequent to processing of the at least one graphics element by the graphics processing unit; and determine the performance information for the at least one graphics element based upon a difference between at least the first and second values of the at least one counter of the graphics processing unit.

23. The device of claim 12, wherein the device comprises a wireless communication device handset.

24. The device of claim 12, wherein the device comprises one or more integrated circuit devices.

25. A device, comprising:

means for receiving performance information provided by a graphics processing unit, wherein the performance information has been measured by the graphics processing unit in association with individual graphics elements for rendering a graphics scene;

means for computing values of a performance metric for the graphics elements based upon the performance information, wherein each computed value is associated with at least one of the graphics elements;

means for assigning graphical identifiers to the graphics elements based upon the computed values of the performance metric for the graphics elements, wherein one of the graphical identifiers is assigned to each of the graphics elements; and means for displaying the graphics elements, when rendering the graphics scene, according to the graphical identifiers that are assigned to the graphics elements.

26. The device of claim 25, wherein the means for receiving the performance information comprises means for receiving values of one or more counters that are collected and provided by the graphics processing unit for each of the graphics elements.

27. The device of claim 25, wherein each of the graphics elements comprises one or more draw commands for rendering the graphics scene, a graphics primitive, a vertex, or a pixel fragment.

28. The device of claim 25, further comprising:

means for displaying a representation of selectable performance metrics; and means for receiving a user selection of one of the selectable performance metrics as the performance metric.

29. The device of claim 25, further comprising means for determining a range of values of the performance metric based upon the computed values of the performance metric for the graphics elements, wherein the means for assigning the graphical identifiers to the graphics elements comprises means for assigning the graphical identifiers to the graphics elements based upon positions of the computed values of the performance metric for the graphics elements within the range of values.

30. The device of claim 25, wherein the means for assigning graphical identifiers to the draw commands comprises means for assigning colors to the graphics elements based upon the computed values of the performance metric for the graphics elements, and wherein one of the colors is assigned to each of the graphics elements.

31. The device of claim 30, wherein the means for displaying the graphics elements comprises means for displaying the individual graphics elements according to the colors that are assigned to the graphics elements.

32. The device of claim 25, wherein the means for receiving the performance information comprises means for receiving values of one or more counters that are collected and provided by the graphics processing unit for each of the graphics elements, wherein the graphics elements comprise pixel fragments, and wherein the means for assigning the graphical identifiers to the graphics elements comprises means for determining the graphical identifiers by using blending to combine multiple ones of the pixel fragments based upon the values of the one or more counters.

33. The device of claim 25, further comprising:

means for determining at least a first value of at least one counter of the graphics processing unit prior to processing at least one of the graphics elements by the graphics processing unit;

means for determining at least a second value of the at least one counter of the graphics processing unit subsequent to processing of the at least one graphics element by the graphics processing unit; and means for determining the performance information for the at least one graphics element based upon a difference between at least the first and second values of the at least one counter of the graphics processing unit.

34. A computer-readable storage medium comprising instructions for causing one or more programmable processors to:

receive performance information provided by a graphics processing unit, wherein the performance information has been measured by the graphics processing unit in association with individual graphics elements for rendering a graphics scene;

compute values of a performance metric for the graphics elements based upon the performance information, wherein each computed value is associated with at least one of the graphics elements;

assign graphical identifiers to the graphics elements based upon the computed values of the performance metric for the graphics elements, wherein one of the graphical identifiers is assigned to each of the graphics elements; and display the graphics elements, when rendering the graphics scene, according to the graphical identifiers that are assigned to the graphics elements.

35. The computer-readable storage medium of claim 34, wherein the instructions to receive the performance information comprise instructions to receive values of one or more counters that are collected and provided by the graphics processing unit for each of the graphics elements.

36. The computer-readable storage medium of claim 34, wherein each of the graphics elements comprises one or more draw commands for rendering the graphics scene, a graphics primitive, a vertex, or a pixel fragment.

37. The computer-readable storage medium of claim 34, further comprising instructions to:

display a representation of selectable performance metrics; and receive a user selection of one of the selectable performance metrics as the performance metric.

38. The computer-readable storage medium of claim 34, further comprising instructions to:

determine a range of values of the performance metric based upon the computed values of the performance metric for the graphics elements, wherein the instructions to assign the graphical identifiers to the graphics elements comprise instructions to assign the graphical identifiers to the graphics elements based upon positions of the computed values of the performance metric for the graphics elements within the range of values.

39. The computer-readable storage medium of claim 34, wherein the instructions to assign graphical identifiers to the draw commands comprise instructions to assign colors to the graphics elements based upon the computed values of the performance metric for the graphics elements, and wherein one of the colors is assigned to each of the graphics elements.

40. The computer-readable storage medium of claim 39, wherein the instructions to display the graphics elements comprise instructions to display the individual graphics elements according to the colors that are assigned to the graphics elements.

41. The computer-readable storage medium of claim 34, wherein the instructions to receive the performance information comprise instructions to receive values of one or more counters that are collected and provided by the graphics processing unit for each of the graphics elements, wherein the graphics elements comprise pixel fragments, and wherein the instructions to assign the graphical identifiers to the graphics elements comprise instructions to determine the graphical identifiers by using blending to combine multiple ones of the pixel fragments based upon the values of the one or more counters.

42. The computer-readable storage medium of claim 34, further comprising instructions to:

determine at least a first value of at least one counter of the graphics processing unit prior to processing at least one of the graphics elements by the graphics processing unit;

determine at least a second value of the at least one counter of the graphics processing unit subsequent to processing of the at least one graphics element by the graphics processing unit; and determine the performance information for the at least one graphics element based upon a difference between at least the first and second values of the at least one counter of the graphics processing unit.

* * * * *